(12) United States Patent
Juliato et al.

(10) Patent No.: US 11,799,883 B2
(45) Date of Patent: *Oct. 24, 2023

(54) ACTIVE ATTACK DETECTION IN AUTONOMOUS VEHICLE NETWORKS

(71) Applicant: Intel Corporation, Santa Clara, CA (US)

(72) Inventors: Marcio Juliato, Portland, OR (US); Vuk Lesi, Durham, NC (US); Shabbir Ahmed, Beaverton, OR (US); Christopher Gutierrez, Hillsboro, OR (US); Manoj Sastry, Portland, OR (US); Liuyang Yang, Portland, OR (US); Xiruo Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,655

(22) Filed: May 31, 2022

(65) Prior Publication Data

US 2022/0294812 A1 Sep. 15, 2022

Related U.S. Application Data

(63) Continuation of application No. 16/723,142, filed on Dec. 20, 2019, now Pat. No. 11,444,961.

(51) Int. Cl.
*H04L 9/40* (2022.01)
*G05B 19/042* (2006.01)
*G05D 1/00* (2006.01)

(52) U.S. Cl.
CPC ........ *H04L 63/1416* (2013.01); *G05B 19/042* (2013.01); *G05D 1/0088* (2013.01);
(Continued)

(58) Field of Classification Search
CPC ............ H04L 63/1416; H04L 2209/84; H04L 12/4035; H04L 63/1425;
(Continued)

(56) References Cited

U.S. PATENT DOCUMENTS 7,006,881 B1 * 2/2006 Hoffberg .............. G06V 40/103
709/200
7,145,875 B2 * 12/2006 Allison ................... H04L 12/66
370/386
(Continued)

FOREIGN PATENT DOCUMENTS

AU  2003241523 B2 * 8/2009 ......... H04L 41/0681
CN     101626381 A * 1/2010 ............. H04L 45/18
(Continued)

OTHER PUBLICATIONS

European Search Report and Written Opinion dated Jan. 30, 2023 for Application No. EP22206751.4 (11 pages).
(Continued)

*Primary Examiner* — Mahendra R Patel
(74) *Attorney, Agent, or Firm* — KDW Firm PLLC

(57) ABSTRACT

Systems, methods, computer-readable storage media, and apparatuses to provide active attack detection in autonomous vehicle networks. An apparatus may comprise a network interface and processing circuitry arranged to receive a first data frame from a first electronic control unit (ECU) via the network interface, determine a voltage fingerprint of the first data frame, compare the voltage fingerprint to a voltage feature of the first ECU, determine that the first data frame is an authentic message when the voltage fingerprint does match the voltage feature of the first ECU, and determine that the first data frame is a malicious message when the voltage fingerprint does not match the voltage feature of the first ECU. Other embodiments are described and claimed.

20 Claims, 14 Drawing Sheets

(52) U.S. Cl.
CPC .............. *G05B 2219/25257* (2013.01); *G05B 2219/2637* (2013.01)

(58) Field of Classification Search
CPC ....... H04L 2012/40215; H04L 63/1458; H04L 12/40; H04L 63/10; G05B 19/042; G05B 2219/25257; G05B 2219/2637; G05B 19/0421; G05D 1/0088; G06F 21/566; G06F 21/567; G06F 21/564; H04W 12/121; H04W 12/61
USPC ........................................................ 726/23
See application file for complete search history.

(56) References Cited

U.S. PATENT DOCUMENTS

| | | | | |
|---|---|---|---|---|
| 8,069,483 | B1* | 11/2011 | Matlock | H04W 12/122 726/13 |
| 9,311,811 | B1* | 4/2016 | Szewczyk | H04L 67/04 |
| 10,095,634 | B2* | 10/2018 | Sharma | G06F 13/4265 |
| 10,142,358 | B1* | 11/2018 | Bajpai | H04L 1/201 |
| 11,550,951 | B2* | 1/2023 | Leekley | H04N 21/8113 |
| 2002/0083331 | A1* | 6/2002 | Krumel | H04L 63/1466 709/237 |
| 2003/0084320 | A1* | 5/2003 | Tarquini | H04L 63/1458 726/25 |
| 2013/0086376 | A1* | 4/2013 | Haynes | G06F 21/577 713/150 |
| 2015/0089236 | A1* | 3/2015 | Han | H04L 63/0227 713/168 |
| 2017/0093908 | A1* | 3/2017 | Elend | H04L 12/40045 |
| 2018/0060267 | A1* | 3/2018 | Sutton | H04L 67/12 |
| 2018/0115516 | A1* | 4/2018 | Rotvold | H04L 63/0209 |
| 2018/0284758 | A1* | 10/2018 | Cella | G05B 23/0283 |
| 2019/0019208 | A1* | 1/2019 | Postrel | G06Q 50/01 |
| 2019/0041835 | A1* | 2/2019 | Cella | G06N 3/006 |
| 2019/0141069 | A1* | 5/2019 | Pogorelik | B60W 20/50 |
| 2019/0245872 | A1* | 8/2019 | Shin | H04L 12/40 |
| 2019/0281052 | A1* | 9/2019 | Lekkas | H04L 9/14 |
| 2019/0379682 | A1* | 12/2019 | Overby | H04L 9/002 |
| 2020/0089172 | A1* | 3/2020 | Yoon | G05D 1/0088 |
| 2020/0389469 | A1* | 12/2020 | Litichever | H04W 4/40 |

FOREIGN PATENT DOCUMENTS

| | | | | |
|---|---|---|---|---|
| CN | 101789931 A | * | 7/2010 | |
| CN | 106612289 A | * | 5/2017 | ......... H04L 63/1425 |
| CN | 107667505 A | * | 2/2018 | ............. H04L 43/04 |
| EP | 3113529 A1 | * | 1/2017 | ......... B60R 16/0231 |
| EP | 3148154 A1 | * | 3/2017 | ....... H04L 12/40045 |
| GB | 2583476 A | * | 11/2020 | ......... G06F 11/2002 |
| WO | WO-2005114947 A1 | * | 12/2005 | ......... H04L 63/0209 |
| WO | WO-2015048058 A1 | * | 4/2015 | ......... H04L 63/0227 |
| WO | WO-2017083862 A1 | * | 5/2017 | ......... G06F 13/4208 |
| WO | WO-2018013171 A1 | * | 1/2018 | ............. H04L 12/40 |
| WO | WO-2018224720 A1 | * | 12/2018 | ......... H04L 63/1425 |
| WO | WO-2019123447 A1 | * | 6/2019 | ............. H04L 12/18 |
| WO | WO-2020123036 A1 | * | 6/2020 | ............ B60W 10/06 |

OTHER PUBLICATIONS

Bosch. CAN with Flexible Data Rate, Specification Version 1.0 (released Apr. 17, 2012).

Elend et al., "Cyber security enhancing CAN transceivers", CAN in Automation 08-1 to 08-4, iCC 2017.

* cited by examiner

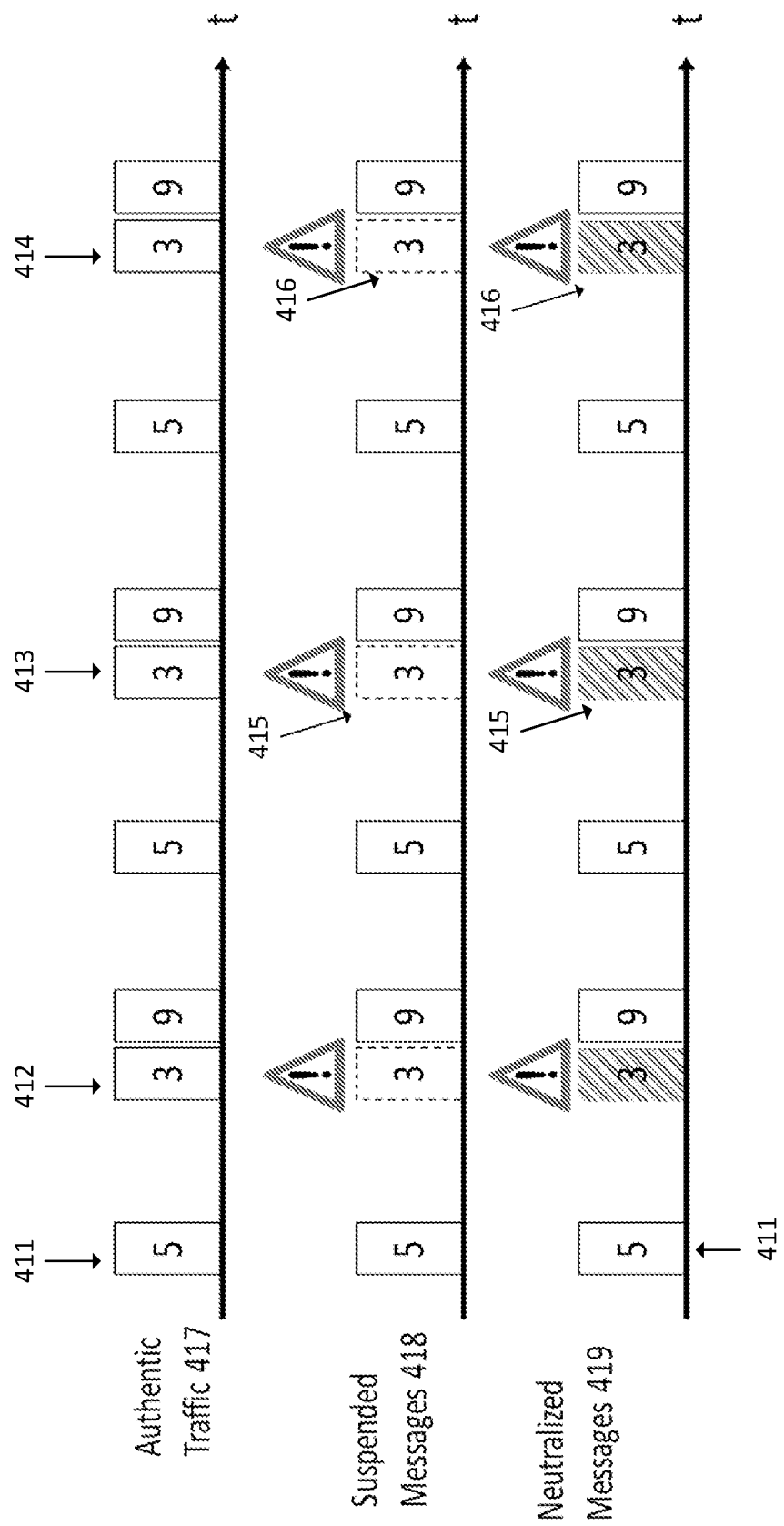

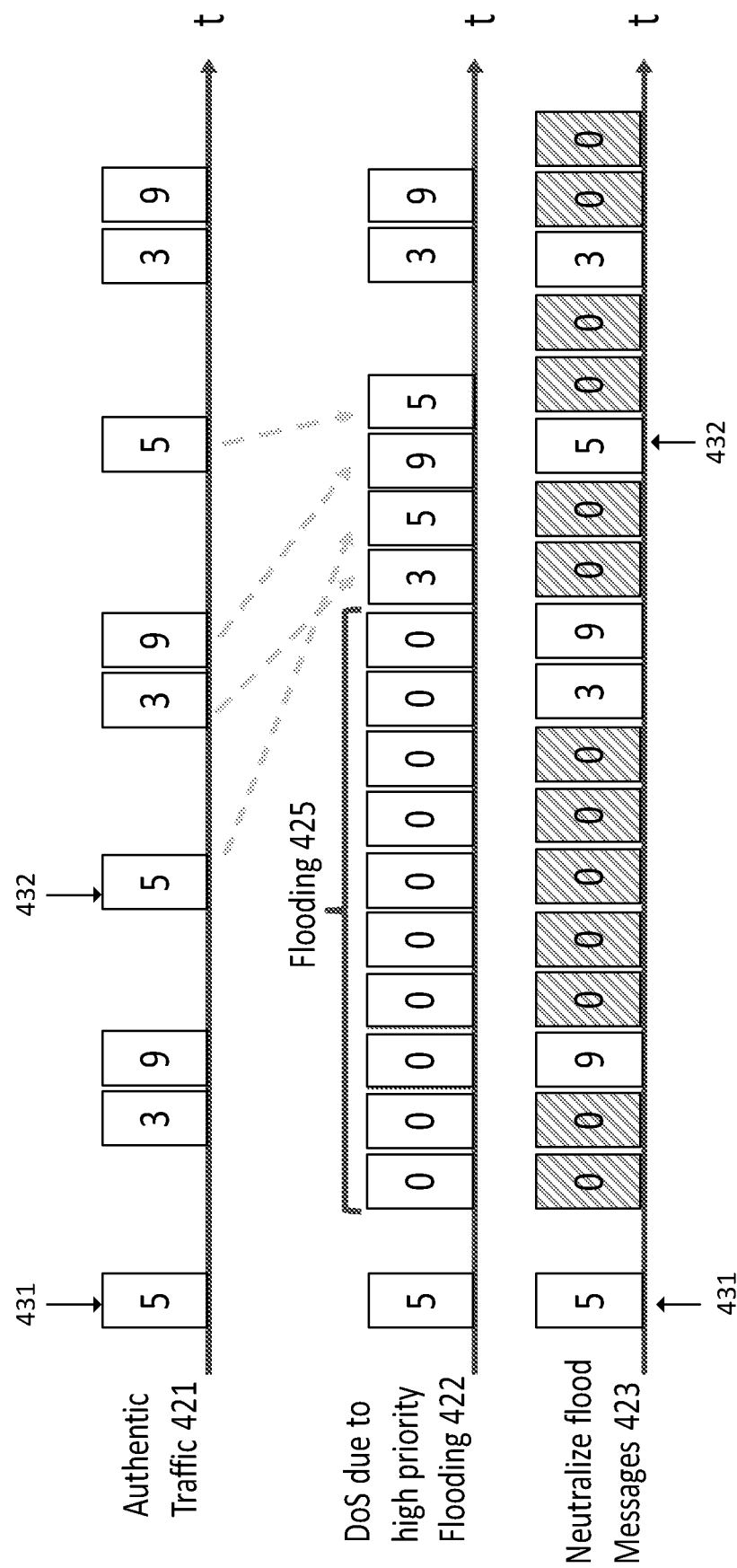

ACTIVE ATTACK DETECTION IN AUTONOMOUS VEHICLE NETWORKS

CROSS-REFERENCE TO RELATED APPLICATIONS

This application is a continuation of, claims the benefit of and priority to previously filed U.S. patent application Ser. No. 16/723,142 filed Dec. 20, 2019, entitled "ACTIVE ATTACK DETECTION IN AUTONOMOUS VEHICLE NETWORKS", which is hereby incorporated by reference in its entirety.

BACKGROUND

Autonomous vehicles include a plurality of components which may be communicably coupled via an in-vehicle communications network. Malicious attackers may attempt to take control over one or more components, which may negatively impact the operation of the autonomous vehicle and pose significant safety risks. Often, it is difficult to detect and/or prevent attacks while keeping authentic message flows intact on the in-vehicle network.

BRIEF DESCRIPTION OF THE DRAWINGS

FIGS. 4A-4C illustrate examples of active attack detection in autonomous vehicle networks.

DETAILED DESCRIPTION

Figure 1:
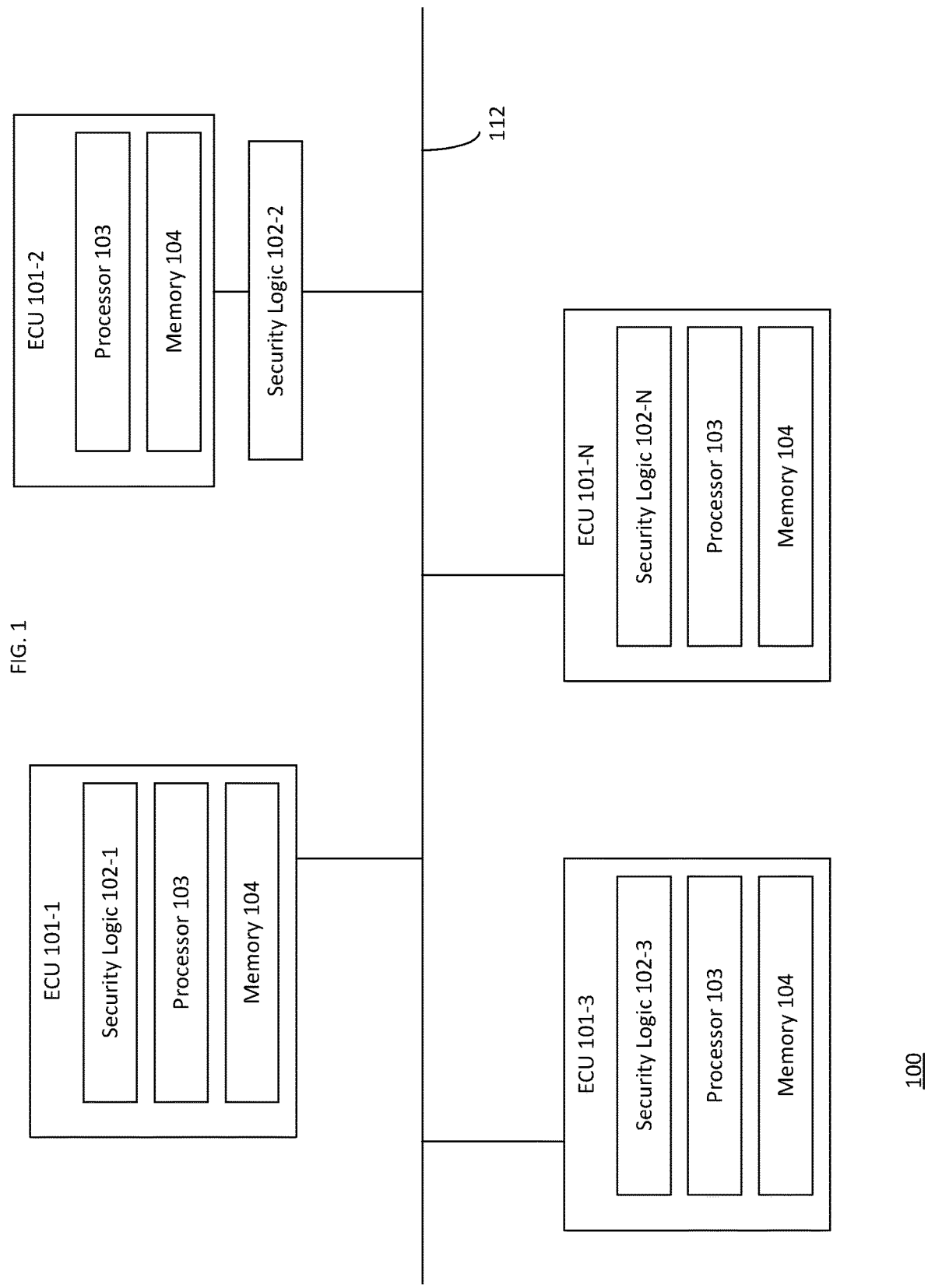
FIG. 1 illustrates an embodiment of a system.

Embodiments disclosed herein provide techniques to detect attacks to components of autonomous vehicles and take corrective actions to neutralize the attacks. For example, embodiments disclosed herein may detect flooding attacks and/or suspension attacks while allowing authentic message flows (e.g., data frames) to remain intact on an in-vehicle network. Furthermore, embodiments disclosed herein may neutralize messages transmitted by a compromised system component to prevent other system components from implementing the commands specified by the messages. Further still, embodiments disclosed herein provide techniques to remove the compromised component from the system such that the compromised component is replaced by a standby component.

Embodiments disclosed herein may provide various approaches to detecting attacks to components (also referred to as electronic control units (ECUs)) of autonomous vehicles. For example, embodiments disclosed herein may provide distributed and/or centralized approaches to detecting attacks. In the distributed approach, hardware security logic may be a component of each ECU (and/or may be positioned between a given ECU and the in-vehicle network). Doing so allows the hardware security logic to prevent flooding attacks by the ECU and/or detect suspension attacks in the autonomous vehicle. In the centralized approach, the hardware security logic may be a standalone component that listens to traffic on the network to prevent flooding attacks by any ECU on the network and/or detect suspension attacks to any ECU on the network.

In the distributed approach, to prevent flooding attacks, the security logic may generally manage the access of the corresponding ECU to the in-vehicle network. In such embodiments, each ECU may have a defined transmission (or transmit) interval during which each ECU can transmit a single message. If the ECU attempts to transmit additional messages during a transmission interval, the security logic may restrict the additional messages from being transmitted via the network. However, if collisions are detected on the network, the security logic may permit the ECU to attempt an additional transmission such that a single message is transmitted by the ECU during the transmission interval. To detect suspension attacks in the distributed approach, the security logic may determine whether the corresponding ECU has transmitted a message during one or more transmission intervals. If the ECU has not transmitted a message during the one or more transmission intervals, the security logic may determine that the ECU is subject to a suspension attack and generate an alert and/or take corrective action (e.g., restrict the ECU from transmitting messages and/or operating in the autonomous vehicle).

In the centralized approach, the security logic may detect flooding attacks based on a voltage fingerprint of transmissions by each ECU. If the voltage fingerprint of a given message does not match (or is not like, or is not equal to) a known voltage fingerprint (also referred to as a "voltage feature", or "voltage features") for the ECU transmitting the message, the security logic may determine that the message is a malicious message and the transmitting ECU is subject to a flooding attack. In such an example, the security logic may generate an alert and/or take corrective action (e.g., neutralize the malicious message, restrict the ECU from transmitting messages and/or operating in the autonomous vehicle). Doing so allows the security logic to neutralize malicious messages while keeping authentic messages. To detect suspension attacks, the security logic may determine whether a given ECU has transmitted a message during a transmission interval. If the ECU has not transmitted a message during the transmission interval, the security logic may determine the ECU is subject to a suspension attack. Furthermore, the security logic may determine whether the ECU transmits a message having an unauthentic voltage fingerprint during a transmission interval. If a message having the unauthentic voltage fingerprint (e.g., a voltage fingerprint that is not equal to one or more known voltage features associated with the transmitting ECU) is detected during a transmission period, the security logic may determine the ECU is subject to a suspension attack and neutralize the message. The security logic may then generate an alert and/or take corrective action for the suspension attack (e.g., restrict the ECU from transmitting messages and/or operating in the autonomous vehicle). Generally, by leveraging the voltage fingerprint, the security logic is able to detect suspension attacks and that a malicious attacker is transmitting the malicious messages. Doing so allows the security logic to neutralize malicious messages while permitting authentic messages to traverse the network.

Conventionally, operations specified in messages transmitted by compromised ECUs may be implemented by other ECUs in the autonomous vehicle. For example, a message sent by a compromised brake controller may cause a brake actuator to maliciously apply the brakes of the autonomous vehicle. Advantageously, however, embodiments disclosed herein may prevent the operations from being implemented in the vehicle. For example, the security logic may analyze at least a portion of a payload of the messages transmitted via the network in light of a current system state. If the security logic determines that the analyzed portion of the payload specifies to modify an operational parameter of the autonomous vehicle to a specified value, the security logic may determine whether the specified value is outside a range of expected values for the operational parameter. For example, if the vehicle is traveling at a speed of 20 miles per hour, the range of expected values for the vehicle speed may be 15-25 miles per hour. If the specified value for the operation parameter is outside the range of expected values (e.g., 50 miles per hour), the security logic may modify the message such that other ECUs of the vehicle do not cause the operational parameter of the autonomous vehicle to take the specified value (e.g., do not cause the autonomous vehicle to accelerate to 50 miles per hour). For example, the security logic may modify a second portion of the message (which may be any field thereof) to corrupt the message such that the message is rejected and/or not consumed by the other ECUs.

Further still, embodiments disclosed herein may provide standby ECUs that may be dynamically activated when compromised ECUs are detected. Doing so allows the standby ECU to provide authentic, valid messages once activated in the autonomous vehicle. For example, a standby brake controller may replace a primary brake controller that is subject to a flooding and/or suspension attack. Furthermore, in some embodiments, the standby ECU may learn the behavior of the primary ECU under normal operating conditions. Doing so allows the standby ECU to immediately replace the compromised ECU and start transmitting messages to keep the actuation cycle of the autonomous vehicle.

Advantageously, embodiments disclosed herein provide techniques to enhance safety in autonomous vehicles. By detecting different types of attacks, embodiments disclosed herein may isolate corrupted ECUs and cause standby ECUs to be activated in the system. Furthermore, by modifying messages transmitted by corrupted ECUs, embodiments disclosed herein ensure that other ECUs in the system do not act on any messages transmitted by a corrupted ECU. Doing so improves the performance of the autonomous vehicle and enhances safety of the operation of the autonomous vehicle.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a system 100. As shown, the system 100 includes a plurality of electronic control units (ECUs) 101-1 through 101-N, where "N" is a positive integer greater than 1. Although four ECUs 101 are depicted in FIG. 1, an apparatus including the system 100 may include any number of ECUs. In one embodiment, the apparatus including the system 100 may include an autonomous vehicle. Generally, an ECU may control one or more components of an autonomous vehicle, such as braking components, power train components, steering components, airbags, and the like. Example ECUs include, but are not limited to, an Engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), or Suspension Control Module (SCM). The plurality of ECUs 101 may be communicably coupled by a network 112, which may also be referred to as a network. In one embodiment, the network 112 comprises a controller area network (CAN) which allows the ECUs 101 to communicate with each other using data frames (also referred to as messages) transmitted according to the CAN message-based protocol and without requiring a centralized host in the system 100. Although the network 112 is discussed with reference to an autonomous vehicle, the disclosure is equally applicable to other types of networks, and the use of an autonomous vehicle as a reference example herein should not be considered limiting of the disclosure.

The ECUs 101 illustratively include a processor 103 and a memory 104. The processor 103 may comprise multiple processor cores, where each core may comprise multiple processing threads. The processor 103 may include a general purpose processor, a special purpose processor, a central processor unit, a controller, a micro-controller, etc. In other embodiments, the ECUs 101 may comprise other types of configurable logic and/or circuitry, such as field programmable gate arrays (FPGAs), microcontrollers, application specific integrated circuits (ASICs), systems on a chip (SoC), programmable logic arrays (PLAs), complex programmable logic devices (CPLDs), or fixed-functionality logic hardware using circuit technology such as, for example, complementary metal oxide semiconductor (CMOS) or transistor-transistor logic (TTL) technology, or any combination thereof.

As shown, the ECUs 101-1, 101-3, and 101-N include an instance of a security logic 102-1, 102-3, and 102-N, respectively. Similarly, an instance of the security logic 102-2 is positioned between the ECU 101-2 and the network 112. Regardless of whether the security logic 102 is incorporated in or external to an ECU 101, the security logic 102 may be configured to regulate access to the network 112 by the corresponding ECU 101. The security logic 102 may be implemented in hardware, software, and/or a combination of hardware and software. For example, the security logic 102 may comprise a microcontroller, FPGA, ASIC, PLA, CMOS, TTL, CPLD, or any other type of logic. In one embodiment, the security logic 102 is an ECU 101.

FIG. 1 represents a "distributed" approach where an instance of the security logic 102 controls access to the network by an ECU 101. For example, when ECU 101-1 attempts to transmit a data frame (or message) via the network 112, the security logic 102-1 may permit and/or restrict the ECU 101-1 from transmitting the data frame. Similarly, when ECU 101-2 attempts to transmit a data frame via the network 112, the security logic 102-2 may permit and/or restrict the ECU 101-1 from transmitting the data frame. The security logic 102 may generally regulate control to the network 112 to avoid flooding attacks by compromised ECUs 101, or detect suspension attacks against a compromised ECU 101. A flooding attack may represent where a malicious entity (e.g., a virus, malware, malicious hardware, etc.) compromises an ECU 101 and causes the ECU 101 transmit a plurality of data frames via the network 112, thereby "flooding" the network 112, which may reflect a form of denial of service attack, as legitimate traffic cannot be transmitted via the network 112. A suspension attack reflects where a malicious entity causes a compromised ECU 101 to refrain from transmitting authentic data frames via the network 112 as expected and/or to transmit fraudulent data frames in lieu of authentic data frames.

Each ECU 101 may be configured to periodically transmit data frames. Each ECU 101 may be associated with one or more unique message identifiers (IDs) which are inserted in messages transmitted by the ECU 101. For example, ECU 101-1 may transmit data frames having message ID values ranging from 0-10, while ECU 101-2 may transmit data frames having message ID values ranging from 11-100, etc. In some embodiments, the message ID values reflect a relative priority for arbitration on the network 112. For example, if ECU 101-1 attempts to transmit a data frame having an ID value of 1 and ECU 101-2 attempts to transmit a data frame having an ID value of 50, the ECU 101-1 would be granted access to the network 112 prior to the ECU 101-2 based on the message ID value 1 having higher priority than message ID value 50. In the general case, the lower the message ID number, the higher the priority of the message.

In some embodiments, each instance of the security logic 102 is programmed to include knowledge of the transmission patterns of the corresponding ECU 101 it manages. In other embodiments, the security logic 102 may learn the transmission patterns of the corresponding ECU 101 by monitoring the timing of data frames transmitted by each ECU 101 in normal operation. Advantageously, the security logic 102 may ensure that each ECU 101 only transmits a single data frame in a given transmit interval and while a transmit window is open for the ECU 101, subject to the exceptions described herein. Doing so allows the security logic 102 to prevent flooding attacks, detect suspension attacks, and take corrective actions to preserve the safety of the system 100 and/or the autonomous vehicle including the system 100. For example, the security logic 102 may disable the impacted ECU 101, restrict the impacted ECU 101 from transmitting data frames, modify data frames transmitted by the impacted ECU 101, and/or cause the impacted ECU 101 to be replaced with a different ECU 101.

In embodiments where the network 112 is a CAN implementation, the functionality described herein may operate low in the CAN stack by observing the data transmitted via the network 112 bit-per-bit to extract information about each frame as it transmits in the network 112. Conventionally, CAN requires messages to be fully received before they can be consumed by an ECU. Thus, conventional solutions must wait for the entire frame to be received before any analysis. Advantageously, however, by operating lower in the CAN stack, embodiments disclosed herein can inspect messages as the message is transmitted through the network. In this way, embodiments disclosed herein facilitate faster (relative to conventional CAN implementations) decisions before the message is received by upper services in the CAN stack and/or other receiving ECUs (which may operate according to the conventional CAN stack and/or the modified CAN stack disclosed herein). Furthermore, although the CAN is one example network implementation disclosed herein, the techniques of the disclosure are applicable to other types of networks.

Figure 2:
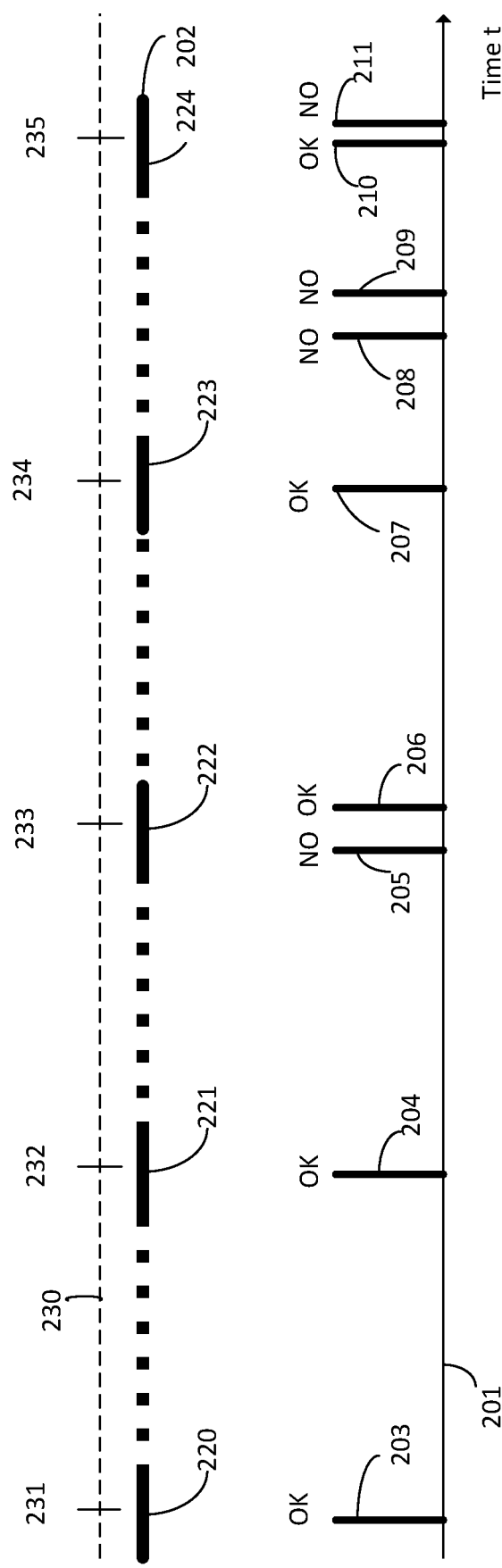
FIG. 2 illustrates an example of active attack detection in autonomous vehicle networks.

FIG. 2 is a timing diagram 200 illustrating examples of detecting flooding attacks to the ECUs 101 of FIG. 1. As shown, the timing diagram 200 includes a timeline 201 reflecting data frames sent by an example ECU 101 of FIG. 1. The timing diagram 200 further includes a timeline 202 representing the transmit window for the example ECU 101. In the timeline 202, solid lines represent an "open" transmit window, where the ECU 101 is permitted to transmit a data frame, while the dashed lines represent a "closed" transmit window, where the ECU 101 is not permitted to transmit data frames via the network 112. The open and/or closed windows may be based on timing windows associated with each ECU 101 and/or a message ID of the data frame to be transmitted by the ECU 101. Therefore, as shown, windows 220-224 correspond to the open transmit windows on the timeline 202. Furthermore, timeline 230 may define transmit intervals based on points 231-235, such as a first transmit interval between points 231 and 232, a second transmit interval between points 232 and 233, and so on. A transmit interval may generally define a time interval (e.g., 1 millisecond, 1 second, etc.) during which a single data frame is to be transmitted by an ECU 101, subject to the exceptions described herein.

As shown on timeline 201, the ECU 101 may attempt to transmit a data frame 203 via the network 112 during open window 220. Because the data frame 203 is the only data frame to be transmitted during the open transmit window 220 (and in the transmit interval ending with point 231), the security logic 102 managing the ECU 101 permits the ECU 101 to transmit the data frame 203. Similarly, because the data frame 204 is the only attempted transmission during the open window 221 and the transmit interval defined by points 231 and 232, the security logic 102 permits the ECU to transmit the data frame 204.

However, in window 222, another ECU 101 may transmit a data frame 205. A collision on the network 112 may occur if the ECU 101 were to transmit a data frame at the same time as data frame 205. Therefore, the security logic 102 may delay transmission of a data frame until the data frame 205 has been transmitted via the network 112. However, doing so may delay the transmission of a data frame 206 to the transmit interval defined by points 233 and 234. However, as shown, the security logic 102 permits the ECU 101 to transmit the data frame 206 once data frame 205 has been transmitted via the network 112 during the window 222 and the transmit interval defined by points 233 and 234.

As shown, the ECU 101 may attempt to transmit data frame 207 during open window 223 and within the transmit interval defined by points 233 and 234. As stated, the security logic 102 generally limits the ECU 101 to a single transmission during a transmit window. However, the security logic 102 may permit transmission of data frame 207 during the time interval defined by points 233 and 234 because the transmission of data frame 206 was delayed due to the detected collision. Therefore, in this example, the security logic 102 is able to determine that the second transmission during the transmit interval defined by points 233 and 234 is authentic, and not a flooding attack by the ECU 101. However, if the data frame 206 was not delayed due to the collision, the security logic 102 may restrict the ECU 101 from transmitting the data frame 207 to prevent a flooding attack, as only one data frame is permitted to be transmitted by a given ECU during a transmit interval.

Furthermore, as shown, the security logic 102 may restrict the transmission of data frames 208, 209, as the ECU 101 attempts to transmit during a closed transmission period. During open window 224, the security logic 102 may permit the transmission of data frame 210, and restrict the transmission of data frame 211, as data frame 211 may reflect a flooding attack. If the security logic 102 determines the ECU 101 is subject to a flooding attack, the security logic 102 may generate and transmit an alert via the network 112 and/or perform corrective actions. For example, the security logic 102 may disable the impacted ECU 101, restrict the impacted ECU 101 from transmitting data frames, modify data frames transmitted by the impacted ECU 101, and/or cause the impacted ECU 101 to be replaced with a different ECU 101.

Figure 3:
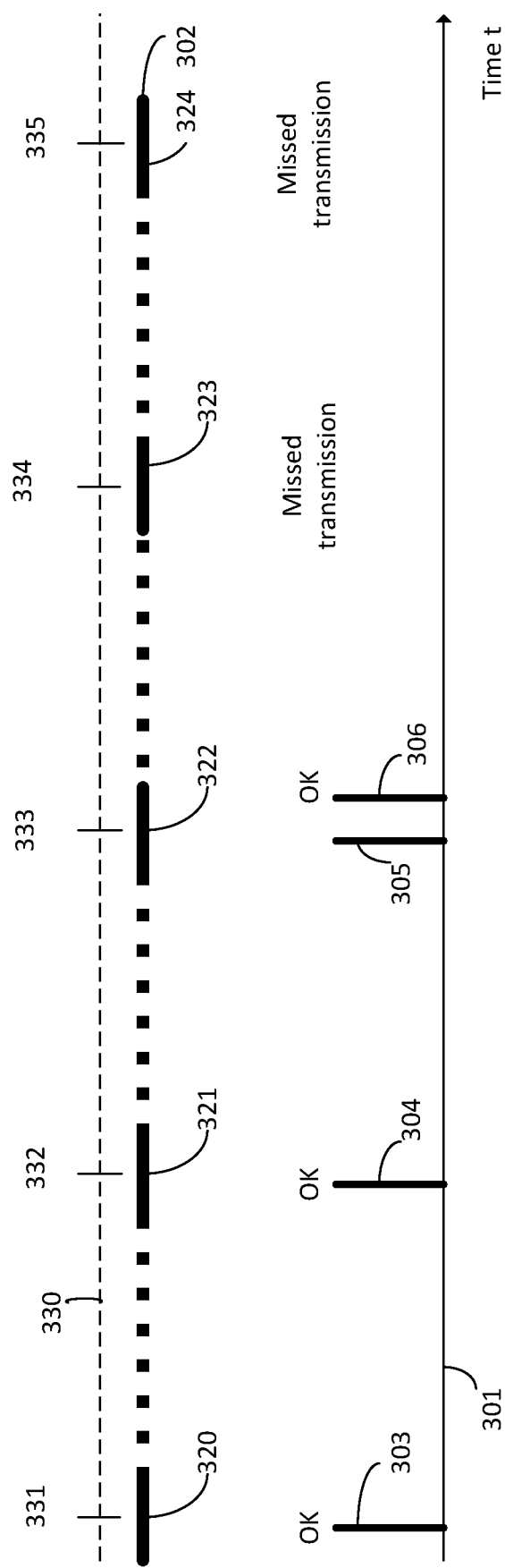
FIG. 3 illustrates an example of active attack detection in autonomous vehicle networks.

FIG. 3 is a timing diagram 300 illustrating examples of detecting flooding attacks to the ECUs 101 of FIG. 1. As shown, the timing diagram 300 includes a timeline 301 reflecting data frames sent by an example ECU 101 of FIG. 1. The timing diagram 300 further includes a timeline 302 representing the transmit window for the example ECU 101. In the timeline 302, solid lines represent an "open" transmit window, where the ECU 101 is permitted to transmit a data frame, while the dashed lines represent a "closed" transmit window, where the ECU 101 is not permitted to transmit data frames via the network 112. The open and/or closed windows may be based on timing windows associated with each ECU 101 and/or a message ID of the data frame to be transmitted by the ECU 101.

As shown, windows 320, 321, 322, 323, and 324 correspond to open transmit windows on the timeline 302. Furthermore, timeline 330 may define transmit intervals based on points 331-335, such as a first transmit interval between points 331 and 332, a second transmit interval between points 332 and 333, and so on. As stated, the ECU 101 may be expected to transmit a single data frame during a transmit interval. Otherwise, the ECU 101 may be subject to a suspension attack.

Therefore, as shown, when ECU 101 transmits data frame 303 during window 320, the security logic 102 determines that the ECU 101 is not under a suspension attack. Similarly, when ECU 101 transmits data frame 304 during window 321, the security logic 102 determines that the ECU 101 is not under a suspension attack. Data frame 305 may be transmitted by a different ECU 101. Therefore, to avoid a collision, the security logic 102 may delay transmission of data frame 306 by the ECU 101. Doing so may cause the ECU 101 to not transmit a data frame during the transmit interval defined by points 332 and 333. Advantageously, however, the security logic 102 does not detect a suspension attack to ECU 101 based on the delay introduced by the collision with data frame 305.

As shown, the ECU 101 does not transmit any additional data frames. Therefore, when the transmit window 323 closes, the security logic 102 may determine that the ECU 101 is subject to a suspension attack. Additionally and/or alternatively, the security logic 102 may determine that the ECU 101 is subject to a suspension attack when transmit window 324 closes without the ECU 101 transmitting a data frame. Additionally and/or alternatively, the security logic 102 may determine that the ECU 101 is subject to a suspension attack when the transmit interval defined by points 334 and 335 passes without the ECU 101 transmitting a data frame. If the security logic 102 determines the ECU 101 is subject to a suspension attack, the security logic 102 may generate and transmit an alert via the network 112 and/or perform corrective actions. For example, the security logic 102 may disable the impacted ECU 101, restrict the impacted ECU 101 from transmitting data frames, modify data frames transmitted by the impacted ECU 101, and/or cause the impacted ECU 101 to be replaced with a different ECU 101.

Figure 4A:
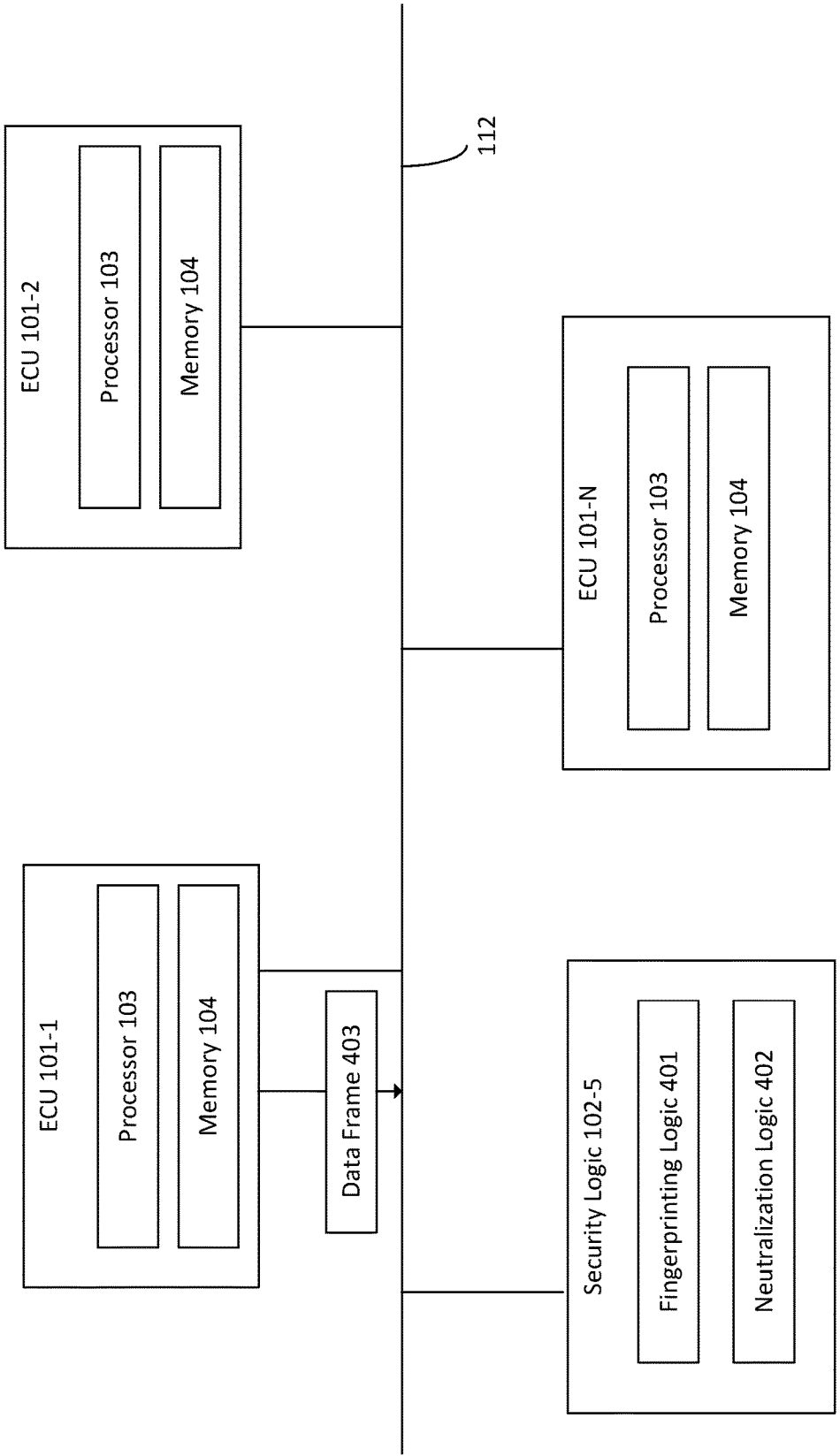

FIG. 4A is a schematic 400 reflecting a "centralized" approach where the ECUs 101 do not include an instance of the security logic 102 and/or where an instance of the security logic 102 is not configured between the ECUs 101 and the network 112. Instead, as shown, a single instance of the security logic 102-5 is coupled to the network 112. As stated, the security logic 102-5 may be an ECU 101. As shown, the security logic 102-5 may include fingerprinting logic 401, the neutralization logic 402, and/or any other pertinent security feature. Although depicted as components of the security logic 102-5, the fingerprinting logic 401 and/or the neutralization logic 402 may be separate from the security logic 102-5 in other embodiments. The fingerprinting logic 401 may analyze a voltage of any data frame (or message, or any other type of communication) transmitted by the ECUs 101 via the network 112, such as the depicted data frame 403 transmitted by ECU 101-1. Additionally and/or alternatively, the fingerprinting logic 401 may measure other properties of the data frame 403, such as timing information, clock skew, current, etc.

For example, the fingerprinting logic 401 may determine a voltage of the data frame 403 is 3.0 volts. However, the fingerprinting logic 401 may store one or more known voltage feature profiles of each ECU 101, which may include a voltage (and/or a range of voltages) for each ECU 101. Therefore, for example, if the known voltage feature profile for ECU 101-1 is 3.3-3.4 volts, the voltages do not match, and the fingerprinting logic 401 may determine that the ECU 101-1 is subject to a flooding and/or suspension attack. For example, if the data frame 403 is the only data frame transmitted during a transmit interval and/or open transmit window, the fingerprinting logic 401 may determine that the ECU 101-1 is subject to a suspension attack.

As another example, if the data frame 403 is one of a plurality of data frames sent by the ECU 101-1 during the transmit interval and/or open transmit window, the fingerprinting logic 401 may determine that the ECU 101-1 is subject to a flooding attack, even if one of the plurality of data frames has a voltage fingerprint of 3.3 volts (and may therefore be an authentic data frame). The fingerprinting logic 401 may determine the appropriate voltage feature based on the message ID included in a given message, and determine the voltage feature associated with the ECU 101 corresponding to the message ID.

The neutralization logic 402 may therefore neutralize the data frame 403 or any other malicious traffic on the network 112. To do so, the neutralization logic 402 may modify the data frame 403 by injecting errors to invalidate the data frame 403, such that the data frame 403 is rejected by the other ECUs 110. For example, the neutralization logic 402 may inject random bits into a cyclic redundancy check portion of the data frame 403. Additionally and/or alternatively, the neutralization logic 402 may inject random bits into a payload of the data frame 403. Additionally and/or alternatively, the neutralization logic 402 may inject random bits into any field of the data frame 403. Doing so may cause any ECUs 101 consuming the modified data frame 403 to reject the data frame as being invalid.

In some embodiments, the security logic 102 may generally analyze the message ID of each data frame transmitted by the ECUs 101 and the voltage fingerprint of each data frame. If the message ID of a data frame does not include a message ID allocated to the corresponding ECU 101, the neutralization logic 402 may modify the data frame to invalidate the data frame. For example, if the data frame 403 has a message ID of 1000, and the voltage features of ECU 101-1 is not associated with the message ID value of 1000, the neutralization logic 402 may invalidate the data frame 403.

FIG. 4B illustrates example techniques for the system 400 to provide centralized suspension detection, according to one embodiment. As shown, a timeline 417 may reflect authentic traffic transmitted by one or more ECUs 101, such as messages 411, 412, 413, and 414. Timeline 418 may reflect suspended messages (depicted in dashed lines), which may be determined by the security logic 102-5 according to the techniques described herein. For example, as shown, an attacker may inject malicious messages 415 and/or 416 as represented as shaded messages in timeline 419. However, the security logic 102-5 may determine that messages 415 and/or 416 are messages sent by an ECU 101 that is subject to a suspension attack. Advantageously, the security logic 102-5 may neutralize the messages 415 and 416 as reflected by the shading in the timeline 419, such that the messages 415 and 416 are not consumed by other ECUs 101. Furthermore, as reflected in the timeline 418, the security logic 102-5 may permit authentic messages, such as message 411 and the other authentic messages from timeline 417, to traverse the network 112.

FIG. 4C illustrates example techniques for the system 400 to provide centralized flooding detection, according to one embodiment. As shown, a timeline 421 may reflect authentic traffic transmitted by one or more ECUs 101, such as messages 431-432. Timeline 422 may reflect a plurality of flooding messages 425, which may be determined by the security logic 102-5 according to the techniques described herein. As shown, the flooding messages 425 are labeled with an example message ID of "0", which would give the flooding messages 425 greater relative priority to the authentic messages For example, as reflected in timeline 422, message 432 has a message ID of 5, giving priority to flooding messages 425, which are transmitted before message 432. Advantageously, the security logic 102-5 may neutralize the flooding messages 425 as reflected by the shading in the timeline 423, such that the messages 425 are not consumed by other ECUs 101. Furthermore, as reflected in the timeline 418, the security logic 102-5 may permit authentic messages, such as messages 431-432 and the other authentic messages from timeline 421, to traverse the network 112 in the appropriate order.

Figure 5A:
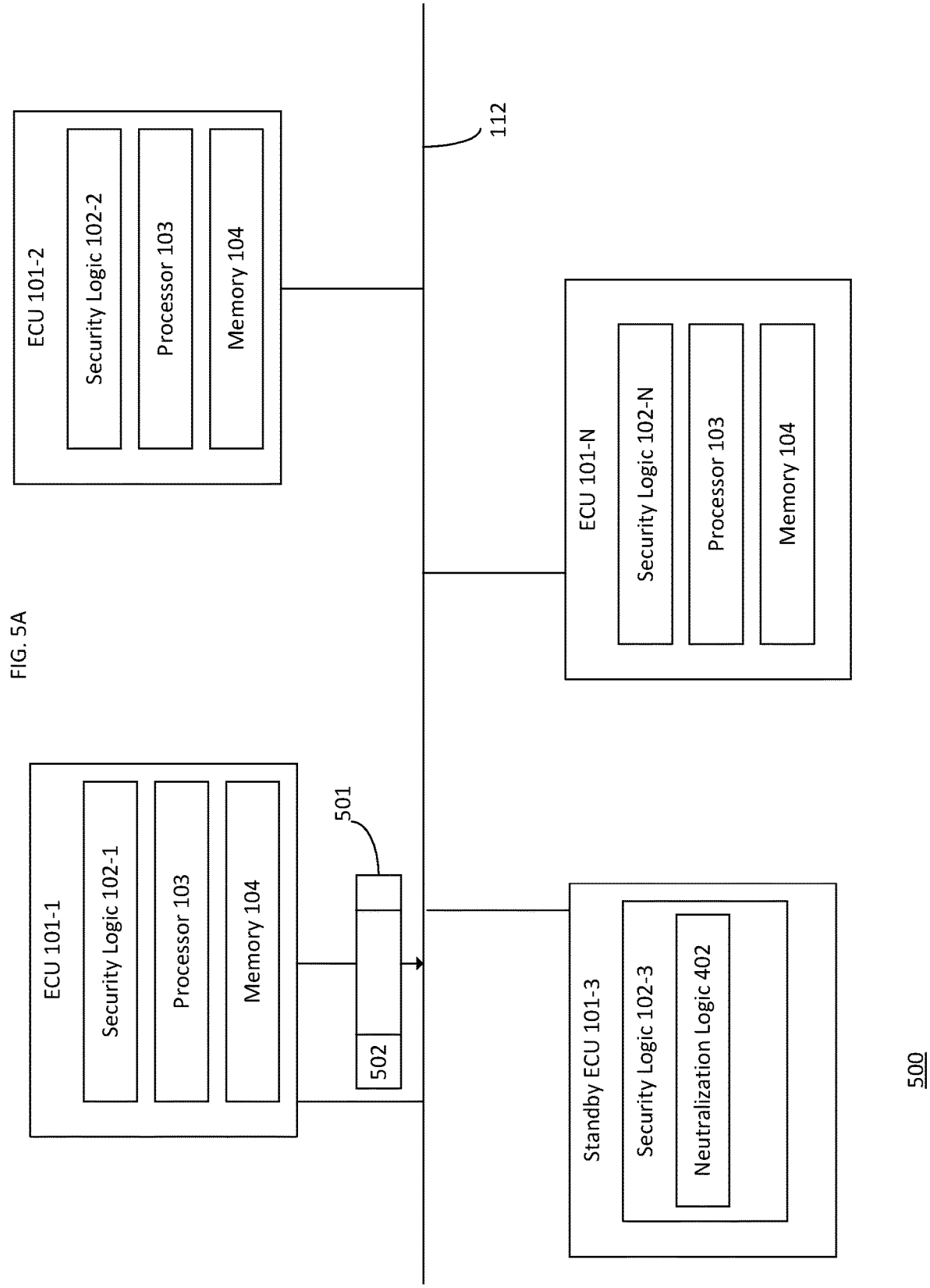
FIGS. 5A-5B illustrate examples of active attack detection in autonomous vehicle networks.

FIG. 5A is a schematic 500 depicting an example of modifying a malicious data frame and replacing an impacted ECU with a standby ECU, according to one embodiment. As shown in FIG. 5A, ECU 101-3 is a standby (or replacement) ECU, e.g., for ECU 101-1. While acting as a standby ECU, the ECU 101-3 may generally operate as the ECU 101-1 would, but without transmitting data via the network 112. Furthermore, the ECU 101-3 may consume data frames generated by the ECU 101-1 during operation. Doing so may allow the ECU 101-3 to learn and/or analyze the behavior of the ECU 101-3, such that a generic ECU may learn to operate as a specific ECU.

The ECU 101-1 may transmit a data frame 501 via the network 112. The security logic 102-3 of the ECU 101-3 may analyze a first portion 502 of the data frame 501 to determine what operational parameter of the autonomous vehicle the data frame 501 intends to modify. For example, the ECU 101-1 may be a brake controller, and the portion 502 of the data frame 501 may specify to fully release the brakes. However, the security logic 102-3 may determine a current state of the autonomous vehicle and determine that releasing the brakes is outside of a range of expected values for an operational state of the brakes. For example, one or more sensor ECUs 101 may indicate that an obstruction is in a path of the autonomous vehicle. As such, the current state of the system requires at least partial application of the brakes to avoid a collision. However, by releasing the brakes, the collision may occur. Therefore, the security logic 102-3 may determine to neutralize the data frame 501 to preserve safety. Advantageously, as stated, by operating at low levels of the network stack, the security logic 102-3 is able to analyze the first portion 502 of the data frame 501 before the entire data frame 501 is received. Doing so allows the security logic 102-3 to neutralize the data frame 501 earlier than conventional network stack solutions.

As another example, the first portion 502 of the data frame 501 may specify to cause the autonomous vehicle to accelerate to 80 miles per hour. However, the security logic 102-3 may determine that the vehicle is currently traveling at 25 miles per hour on a city street with a speed limit of 25 miles per hour. Based on the current state of the autonomous vehicle, the acceleration to 80 miles per hour would be outside of a range of expected speeds (e.g., 20-25 miles per hour) and impose safety risks. Therefore, the security logic 102-3 may determine to neutralize the data frame 501 to preserve safety.

Figure 5B:
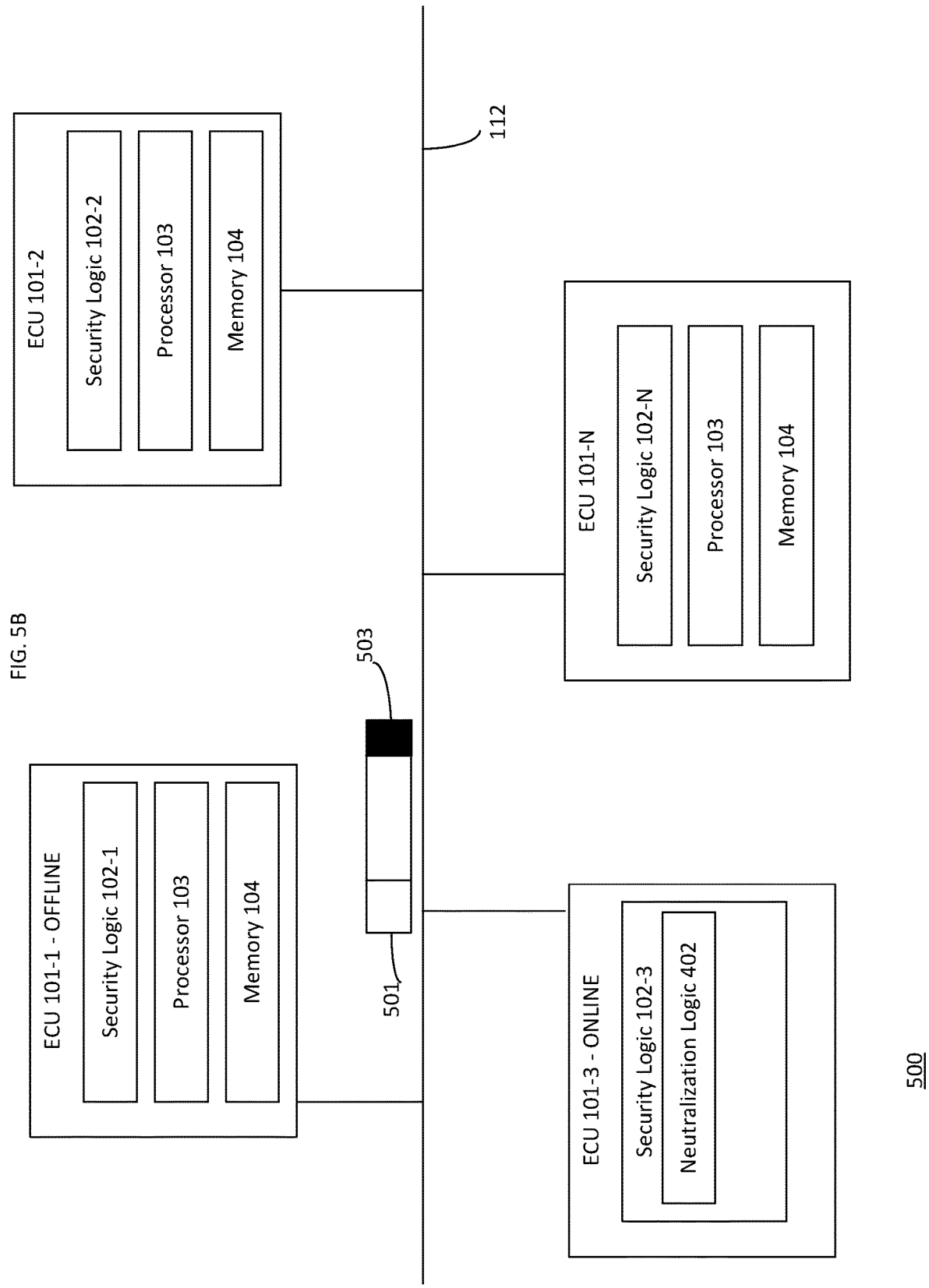

FIG. 5B depicts an embodiment where the neutralization logic 402 has modified a second portion 503 of the data frame 501 to prevent the data frame 501 from being consumed and/or implemented by the target ECU 101. For example, by injecting random bits into the second portion 503, the target ECU 101 will not cause the data frame instructions to be implemented in the autonomous vehicle. The second portion 503 of the data frame may be any portion of the data frame 503. Continuing with the example where application of the brakes to avoid a collision, therefore, one or more ECUs 101 comprising the brake subsystem will not cause the brakes to be released. Doing so may avoid the collision.

Furthermore, as shown, based on the detected malicious data frame 501, the ECU 101-1 may be taken offline or otherwise removed from operation in the autonomous vehicle. The standby ECU 101-3 may then be brought online to take the place of the ECU 101-1. In some embodiments, the standby ECU 101-3 may generate and transmit a valid data frame based on the current state of the autonomous vehicle. For example, the ECU 103-1 may generate a data frame specifying to apply the brakes to avoid the collision with the obstruction.

Although depicted as a component of the ECU 101-3, the security logic 102-3 may be in a different ECU 101-S (not depicted) that is an ECU dedicated to security functions. Therefore, such an ECU 101-S may include instances of the security logic 102, the fingerprinting logic 401, the neutralization logic 402, and/or any other pertinent security feature. In such an example, the ECU 101-S and components thereof may determine that the ECU 101-1 is compromised and communicate (e.g. via the network 112 and/or a side band bus) with the standby ECU 101-3 to bring the standby ECU 101-3 online to replace ECU 101-1. Furthermore, although depicted as components of the security logic 102-3, the neutralization logic 402 may be separate from the security logic 102-3 in other embodiments.

Although discussed with reference to the security logic 102-3 in FIGS. 5A-5B, any instance of the security logic 102 may analyze a data frame, neutralize invalid data frames, and/or replace corrupted ECUs with standby ECUs. Furthermore, in embodiments where the network 112 is a CAN, the ECUs 101 and/or the security logic 102 may leverage the CAN protocol to implement additional logic, as the conventional CAN protocol requires analysis of the entire data frame (also referred to as a frame) before taking corrective action. However, doing so would cause other ECUs consuming a given data frame to implement instructions carried in the data frame (e.g., to release the brakes). Additionally and/or alternatively, the techniques may modify the network protocol (e.g. modify the CAN bus standard) to achieve enhanced functionality and/or performance. By using the described strategies, embodiments disclosed herein may improve performance of the autonomous vehicle by causing malicious instructions to be ignored and/or rejected.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
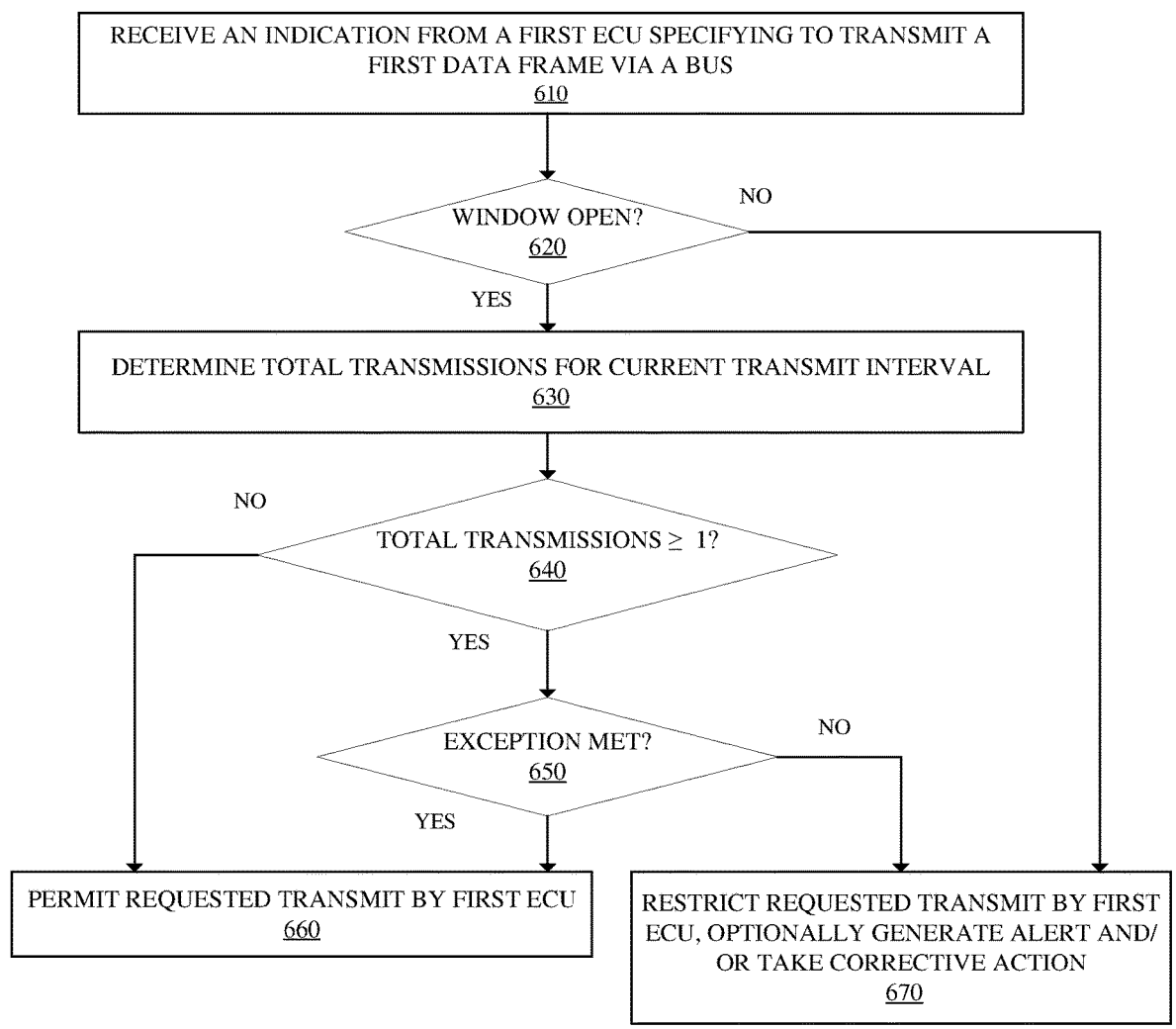
FIG. 6 illustrates an example of a first logic flow.

FIG. 6 illustrates an embodiment of a logic flow 600. The logic flow 600 may be representative of some or all of the operations executed by one or more embodiments described herein. For example, the logic flow 600 may represent some or all of the operations performed by the security logic 102 to detect flooding attacks in the centralized mode. Embodiments are not limited in this context.

As shown, the logic flow 600 begins at block 610, where the security logic 102 coupled to (or included in) an ECU 101 receives a request from the ECU specifying to transmit a first data frame via the network 112. For example, ECU 101-1 may attempt to transmit the first data frame, and the security logic 102-1 may arbitrate access to the network 112. At block 620, the security logic 102-1 determines whether a transmit window for the ECU 101-1 is currently open. In at least one embodiment, the security logic 102-1 includes information specifying timing windows for each ECU 101-1 through 101-N. In some embodiments, the security logic 102-1 determines whether the window for the ECU 101-1 is open based on a message ID included in the data frame. If the window is not open, the logic flow 600 proceeds to block 670, where the security logic 102-1 restricts transmission of the data frame. The security logic 102-1 may further generate an alert and/or take corrective action, such as taking the ECU 101-1 offline, replacing the ECU 101-1 with a standby ECU, and the like.

Returning to block 620, if the window is open, the logic flow 600 proceeds to block 630, where the security logic 102-1 determines a total number of data frames transmitted by the requesting ECU 101-1 during a current transmit interval. The security logic 102-1 may generally maintain a counter of how many data frames are transmitted by the ECU 101-1 during a transmit interval and reset the counter at the end of each transmit interval. At block 640, the security logic 102-1 determines whether the total count of data frames determined at block 630 is greater or equal to than one. If the total count is not greater than or equal to one (e.g., zero), the logic flow 600 proceeds to block 660, where the security logic 102-1 permits the transmission of the first data frame via the network 112. However, if a collision were to occur on the network 112, the security logic 102-1 may delay transmission of the first data frame via the network 112.

Returning to block 640, if the total number of data frames transmitted by the ECU 101-1 is greater than or equal to 1, the logic flow 600 proceeds to block 650, where the security logic 102-1 determines whether an exception is met. As stated, an ECU 101 is limited to single transmission during a transmit interval subject to exceptions. The exception may comprise that a prior transmission was delayed due to a collision, which pushed the prior transmission to the current transmit interval. If the exception is met, the logic flow proceeds to block 660, where the transmission is permitted. Otherwise, the logic flow proceeds to block 670, where the transmission is restricted.

Figure 7:
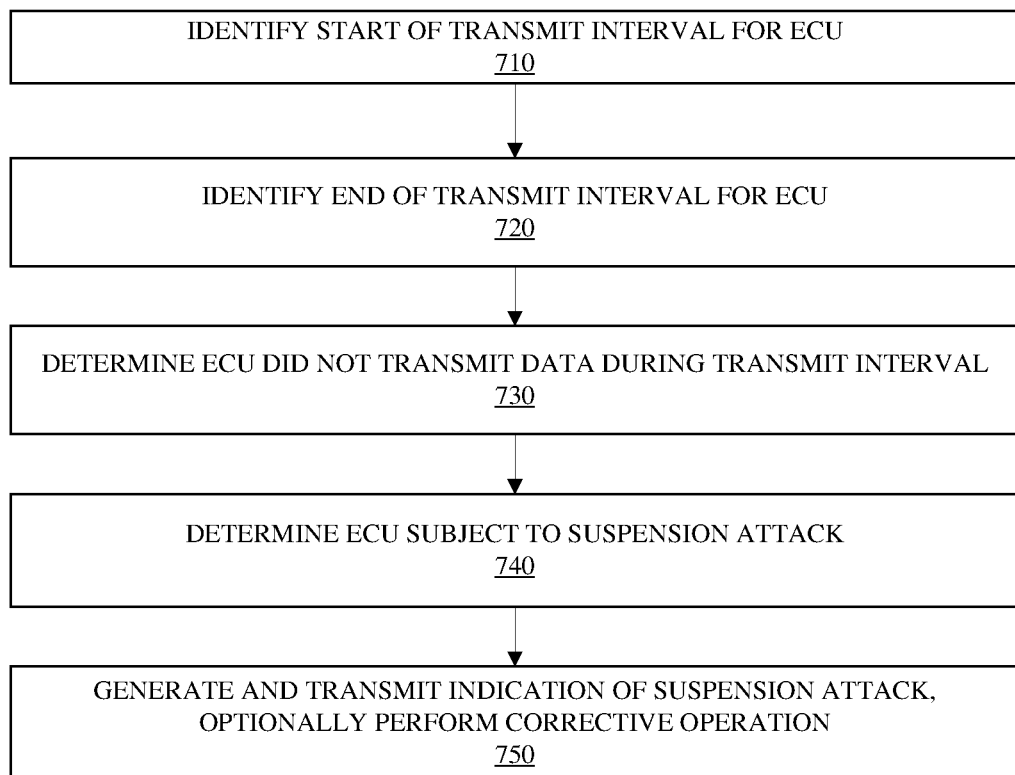
FIG. 7 illustrates an example of a second logic flow.

FIG. 7 illustrates an embodiment of a logic flow 700. The logic flow 700 may be representative of some or all of the operations executed by one or more embodiments described herein. For example, the logic flow 700 may be representative of some or all of the operations executed by the security logic 102 to detect suspension attacks in the distributed mode. Embodiments are not limited in this context.

As shown, the logic flow 700 begins at block 710, where the security logic 102 identifies the start of a transmit interval for an ECU 101. For example, the security logic 102-1 may determine a transmit interval has opened for ECU 101-1 based on a message ID associated with the ECU 101-1. At block 720, the security logic 102-1 identifies the end of the transmit interval for the ECU 101-1. At block 730, the security logic 102-1 determines that the ECU 101-1 did not transmit data during the transmit interval. At block 740, the security logic 102-1 determines that the ECU 101-1 is subject to a suspension attack. At block 750, the security logic 102-1 generates an alert specifying the ECU 101-1 is subject of the suspension attack and transmits the alert via the network 112. Additionally and/or alternatively, the security logic 102-1 may perform a corrective action, such as by disabling the ECU 101-1 and/or replacing the ECU 101-1 with a standby ECU 101-2.

Figure 8:
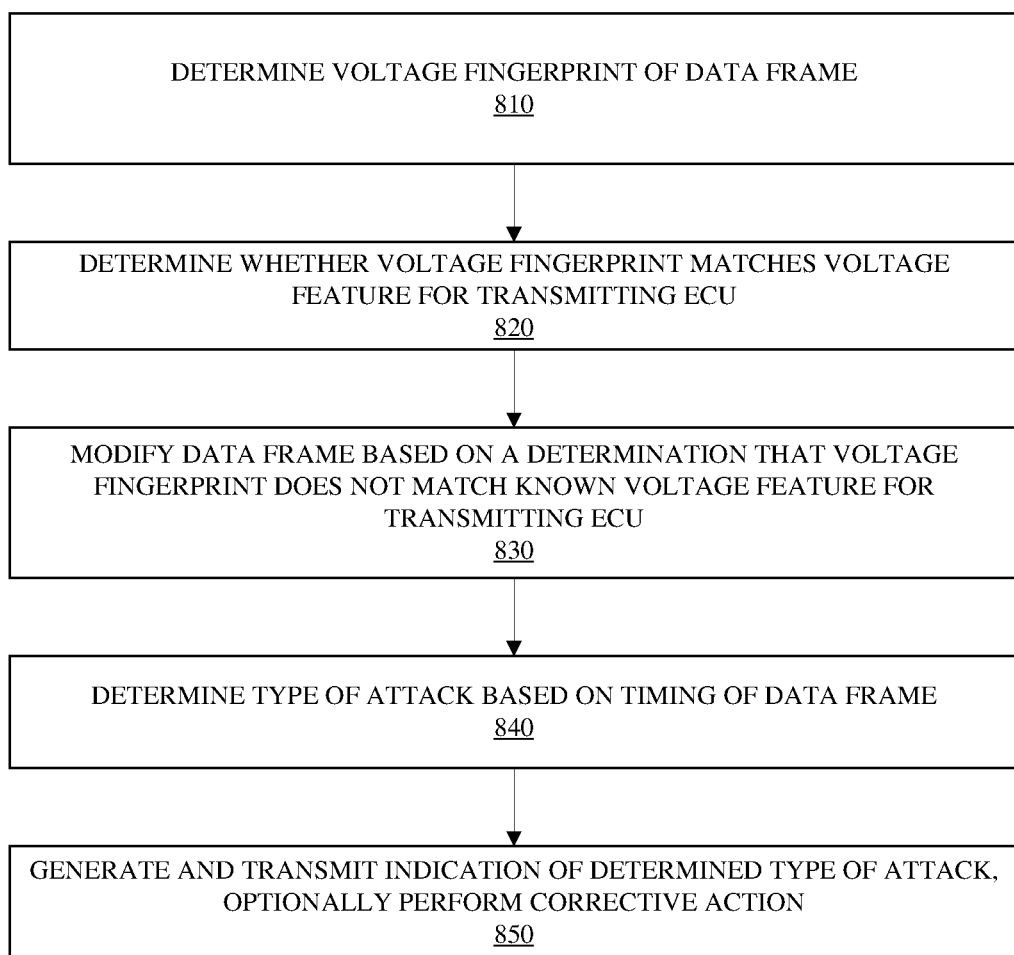
FIG. 8 illustrates an example of a third logic flow.

FIG. 8 illustrates an embodiment of a logic flow 800. The logic flow 800 may be representative of some or all of the operations executed by one or more embodiments described herein. For example, the logic flow 800 may be representative of some or all of the operations executed by the security logic 102 to detect attacks in the centralized mode. Embodiments are not limited in this context.

As shown, the logic flow 800 begins at block 810, where the centralized ECU 101-5 determines a voltage fingerprint of a data frame received from an ECU 101-1 via the network 112. At block 820, the security logic 102-5 determines whether one or more voltage levels of the data frame is not equal to one or more voltage features of the ECU 101-1. The voltage feature may be a known voltage feature associated with the ECU 101-1 and/or a range of voltages associated with the ECU 101-1. At block 830, the security logic 102-5 may modify the data frame by based on a determination that the voltage of the data frame does not equal the voltage feature for the ECU 101-1. For example, the security logic 102-5 may modify one or more bits of the data frame to cause the data frame to be corrupted. For example, the security logic 102-5 may modify the payload, a CRC, and/or any portion of the data frame to corrupt the data frame. At block 840, the security logic 102-5 may determine a type of the attack based on a timing of the data frame. For example, if the data frame is the only data frame sent by the ECU 101-1 during the current transmit interval, the security logic 102-5 may determine that the ECU 101-1 is subject to a suspension attack. Additionally and/or alternatively, if multiple data frames have been sent by the ECU 101-1 during the current transmit interval, the security logic 102-5 may determine that the ECU 101-1 is subject to a flooding attack. At block 850, the security logic 102-5 may generate and transmit an alert on the network 112 specifying the determined type of attack. The security logic 102-5 may further perform a corrective action, such as disabling the ECU 101-1, preventing the ECU 101-1 from transmitting data via the network 112, replacing the ECU 101-1 with a standby ECU 101-2, and the like.

Figure 9:
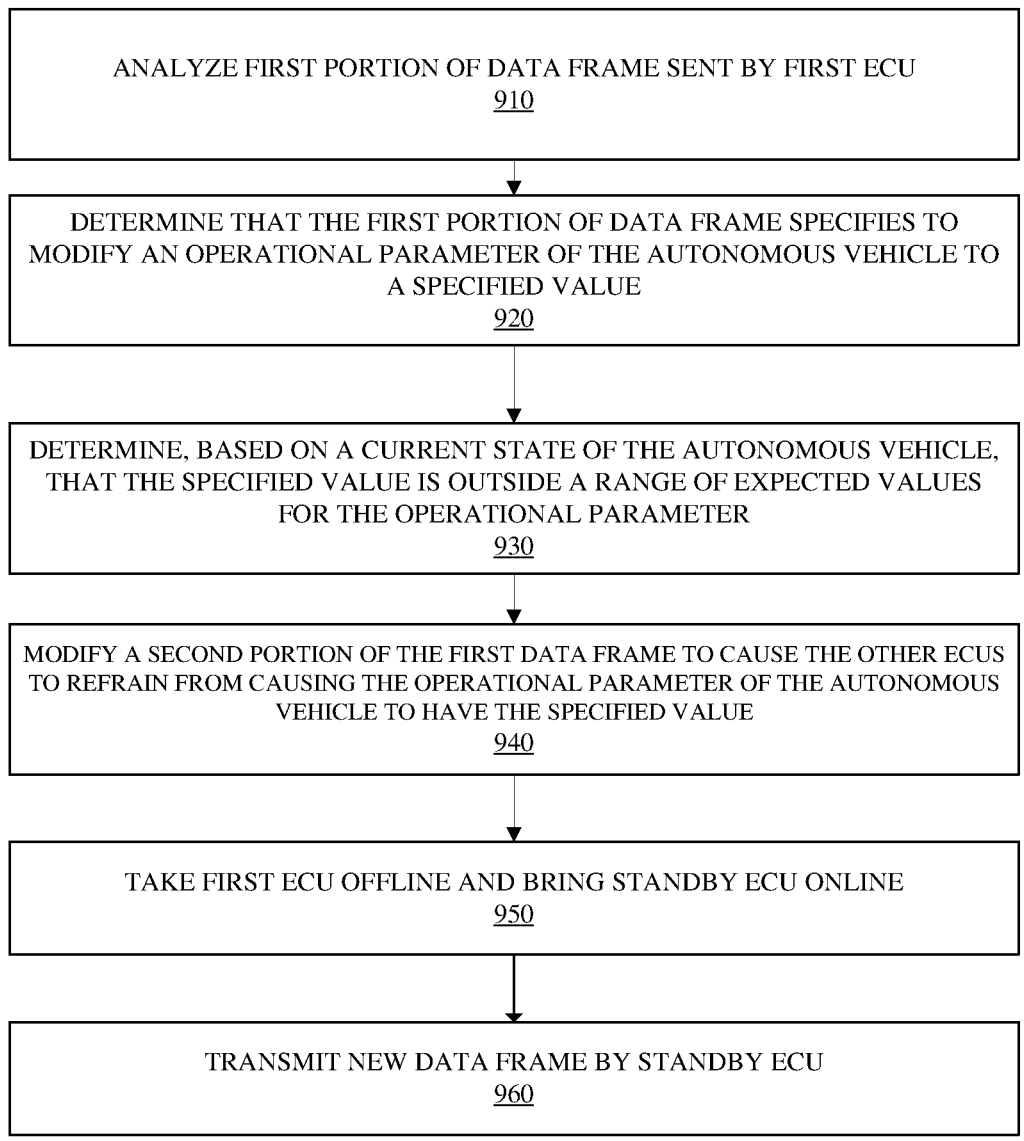
FIG. 9 illustrates an example of a fourth logic flow.

FIG. 9 illustrates an embodiment of a logic flow 900. The logic flow 900 may be representative of some or all of the operations executed by one or more embodiments described herein. For example, the logic flow 900 may be representative of some or all of the operations executed to modify messages and perform corrective actions. Embodiments are not limited in this context.

As shown, at block 910, an instance of the security logic 102 may receive a data frame sent by a first ECU 101, such as the ECU 101-1. The security logic 102 may be in the security logic 102-5 in the centralized mode and/or an instance of the security logic 102 in the distributed mode (e.g., the security logic 102-1). Generally, at block 910, the security logic 102 may analyze a first portion of the data frame sent by the first ECU 101-1. At block 920, the security logic 102 determines that the first portion of the data frame specifies to modify an operational parameter of the autonomous vehicle to have a specified value. For example, the first portion of the payload may specify to cause the autonomous vehicle to travel at 50 miles per hour and/or to apply the brakes.

At block 930, the security logic 102 determines, based on a current operational state of the autonomous vehicle, that the specified value is outside of a range of expected values for the operational parameter. For example, if the autonomous vehicle is currently idling at a red stop light, the security logic 102 may expect the autonomous vehicle to remain stationary (or below 1 mile per hour) until the red light turns green. Therefore, the acceleration to 50 miles per hour may be outside of the range of expected values. At block 940, the security logic 102 may modify a second portion of the payload of the data frame. Doing so causes other ECUs 101 consuming the data frame to reject the data frame. Doing so also causes the other ECUs 101 to refrain from causing the autonomous vehicle from having the specified parameter (e.g., to travel at 50 miles per hour). At block 950, the security logic 102 may take the ECU 101-1 offline or otherwise disable the ECU 101-1 and brings a standby ECU 101-2 online to take the place of the ECU 101-1. At block 960, the standby ECU 101-2, now online, transmits a new data frame to replace the data frame sent by the first ECU 101-1. For example, the new data frame may specify to maintain the current idle state of the autonomous vehicle since the traffic light remains red.

Figure 10:
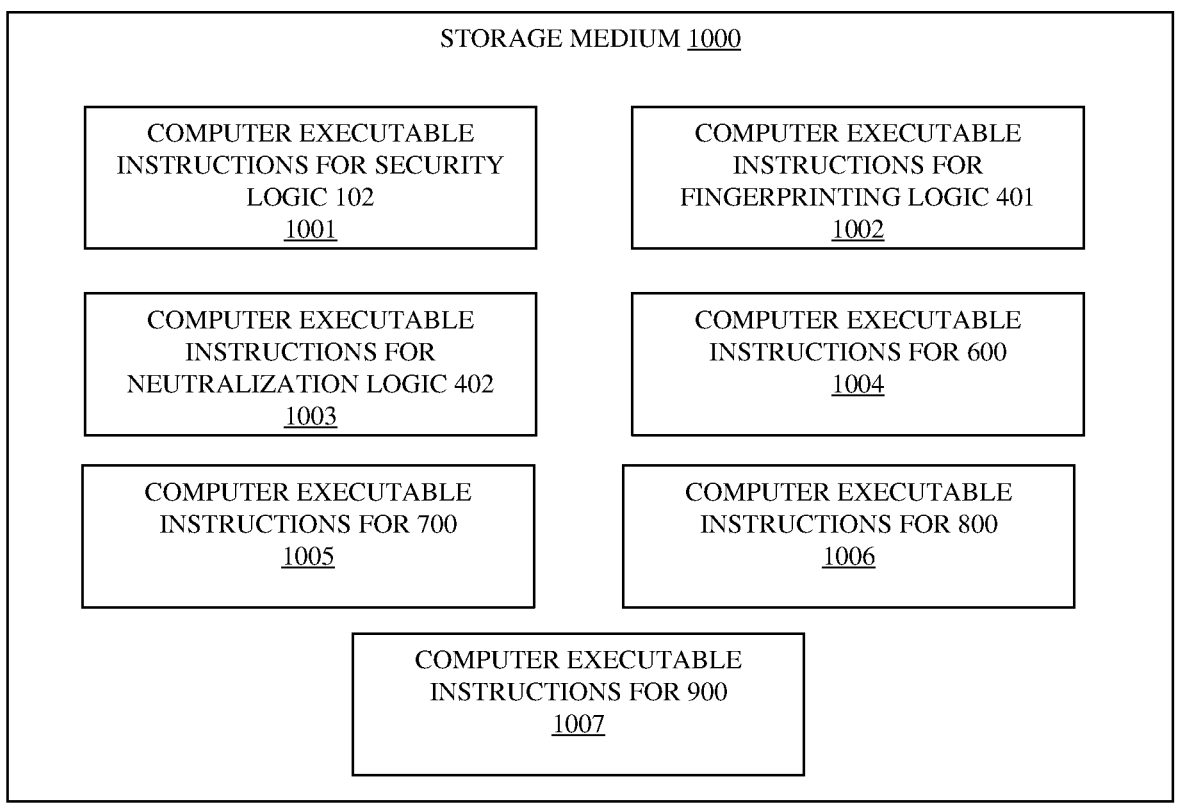
FIG. 10 illustrates an embodiment of a storage medium.

FIG. 10 illustrates an embodiment of a storage medium 1000. Storage medium 1000 may comprise any non-transitory computer-readable storage medium or machine-readable storage medium, such as an optical, magnetic or semiconductor storage medium. In various embodiments, storage medium 1000 may comprise an article of manufacture. In some embodiments, storage medium 1000 may store computer-executable instructions, such as computer-executable instructions to implement one or more of logic flows or operations described herein, such as instructions 1001 for the security logic 102, instructions 1002 for the fingerprinting logic 401, and instructions 1003 for the neutralization logic 402. Similarly, the storage medium 1000 may store computer-executable instructions 1004-1007 for logic flows 600, 700, 800, and 900 of FIGS. 6-9 respectively. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
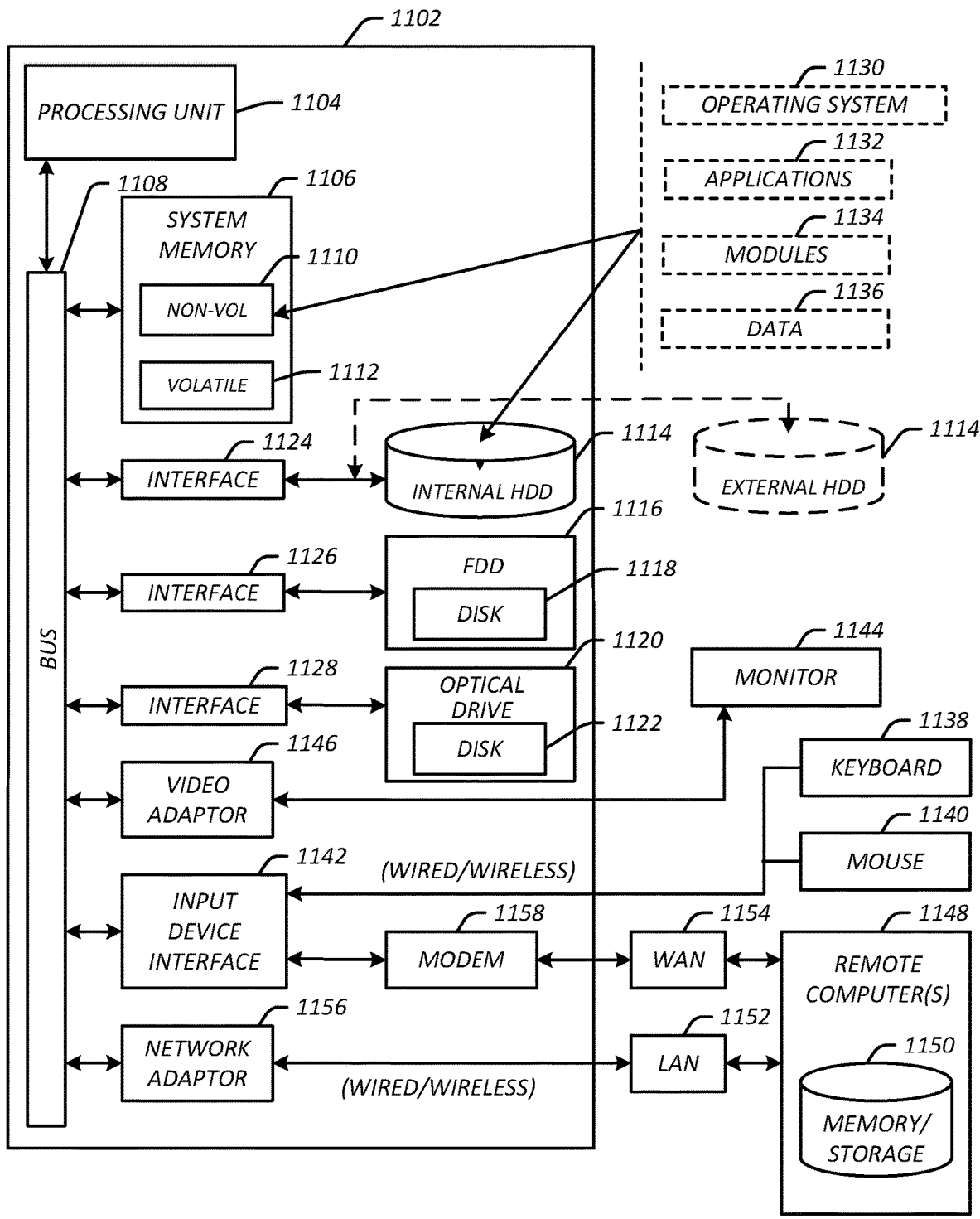
FIG. 11 illustrates an embodiment of a system.

FIG. 11 illustrates an embodiment of an exemplary computing architecture 1100 comprising a computing system 1102 that may be suitable for implementing various embodiments as previously described. In various embodiments, the computing architecture 1100 may comprise or be implemented as part of an electronic device. In some embodiments, the computing architecture 1100 may be representative, for example, of a system that implements one or more components of the system 100. In some embodiments, computing system 1102 may be representative, for example, of the ECUs 101 or security logic 102 of the systems 100 or 400. The embodiments are not limited in this context. More generally, the computing architecture 1100 is configured to implement all logic, applications, systems, methods, apparatuses, and functionality described herein with reference to FIGS. 1-10.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and network interfaces.

The computing system 1102 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1102.

As shown in FIG. 11, the computing system 1102 comprises a processor 1104, a system memory 1106 and a system bus 1108. The processor 1104 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 1104.

The system bus 1108 provides an interface for system components including, but not limited to, the system memory 1106 to the processor 1104. The system bus 1108 can be any of several types of bus structure that may further interconnect to a memory bus (with or without a memory controller), a peripheral bus, and a local bus using any of a variety of commercially available bus architectures. In one embodiment, the network 112 is the bus 1108. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE-PROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computing system 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies. The computing system 1102 is generally is configured to implement all logic, systems, methods, apparatuses, and functionality described herein with reference to FIGS. 1-10.

The drives and associated computer-readable media provide volatile and/or nonvolatile storage of data, data structures, computer-readable instructions, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100, such as the security logic 102.

A user can enter commands and information into the computing system 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computing system 1102. In addition to the monitor 1144, a computer typically includes other peripheral output devices, such as speakers, printers, and so forth.

The computing system 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computing system 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computing system 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computing system 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computing system 1102, or portions thereof, can be stored in the remote memory/storage device 1150. It will be appreciated that the network connections shown are exemplary and other means of establishing a communications link between the computers can be used.

The computing system 1102 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

The following examples pertain to further embodiments, from which numerous permutations and configurations will be apparent.

Example 1 is an autonomous vehicle, comprising: a plurality of electronic control units communicably coupled by a network; and logic, at least a portion of which is implemented in hardware, the logic to: receive an indication from a first electronic control unit (ECU) of the plurality of ECUs specifying to transmit a first data frame via the network; determine, based on a message identifier (ID) of the first ECU, whether a transmit window for the first ECU is open; and permit the first ECU to transmit the first data frame via the network based on a determination that the transmit window for the first ECU is open.

Example 2 includes the subject matter of claim 1, the logic further configured to: determine that a second ECU of the plurality of ECUs is to transmit a data frame via the network during the transmit window for the first ECU; delay the transmission of the first data frame by the first ECU; and permit the first ECU to transmit the first data frame subsequent to the second ECU transmitting the data frame and during the transmit window for the first ECU, at least a portion of the transmit window included in a transmit interval to transmit data via the network.

Example 3 includes the subject matter of example 2, the logic further configured to: receive, during the transmit interval, a second indication from the first ECU specifying to transmit a second data frame via the network during a second transmit window, at least a portion of the second transmit window included in the transmit interval; and permit the first ECU to transmit the second data frame during the portion of the second transmit window included in the transmit interval based on the determination that the second ECU transmitted data via the network during the transmit window for the first ECU.

Example 4 includes the subject matter of example 1, the logic further configured to: determine, based on the message ID of the first ECU, that a transmit interval for the first ECU has opened and closed; determine that the first ECU did not transmit data during the transmit interval; determine that the first ECU is subject to a suspension attack; and generate an alert specifying that the first ECU is subject to the suspension attack.

Example 5 includes the subject matter of example 1, the logic further configured to: determine a voltage fingerprint of the first data frame; determine that the voltage fingerprint is not equal to a voltage feature of the first ECU; and modify, based on the determination that the voltage fingerprint not equal to the voltage feature of the first ECU, at least a portion of the first data frame.

Example 6 includes the subject matter of example 5, wherein one or more of a cyclic redundancy check portion of the first data frame or a payload of the first data frame are to be modified to cause the other ECUs to reject the first data frame, wherein the network comprises a controller area network (CAN).

Example 7 includes the subject matter of example 1, further comprising a standby ECU of the plurality of ECUs configured to: analyze a first portion of a payload of the first data frame; determine that the first portion of the payload specifies to modify an operational parameter of the autonomous vehicle to a specified value; determine, based on a current state of the autonomous vehicle, that the specified value is outside a range of expected values for the operational parameter; and modify a second portion of the payload of the first data frame to cause the other ECUs to refrain from causing the operational parameter of the autonomous vehicle to have the specified value.

Example 8 includes the subject matter of example 7, the standby ECU further configured to: restrict the first ECU from operating in the autonomous vehicle; and operate as the first ECU in the autonomous vehicle.

Example 9 is an apparatus, comprising: a plurality of electronic control units of an autonomous vehicle communicably coupled by a network; and logic, at least a portion of which is implemented in hardware, the logic to: receive an indication from a first electronic control unit (ECU) of the plurality of ECUs specifying to transmit a first data frame via the network; determine, based on a message identifier (ID) of the first ECU, whether a transmit window for the first ECU is open; and permit the first ECU to transmit the first data frame via the network based on a determination that the transmit window for the first ECU is open.

Example 10 includes the subject matter of example 9, the logic further configured to: determine that a second ECU of the plurality of ECUs is to transmit a data frame via the network during the transmit window for the first ECU; delay the transmission of the first data frame by the first ECU; and permit the first ECU to transmit the first data frame subsequent to the second ECU transmitting the data frame and during the transmit window for the first ECU, at least a portion of the transmit window included in a transmit interval to transmit data via the network.

Example 11 includes the subject matter of example 10, the logic further configured to: receive, during the transmit interval, a second indication from the first ECU specifying to transmit a second data frame via the network during a second transmit window, at least a portion of the second transmit window included in the transmit interval; and permit the first ECU to transmit the second data frame during the portion of the second transmit window included in the transmit interval based on the determination that the second ECU transmitted data via the network during the transmit window for the first ECU.

Example 12 includes the subject matter of example 9, the logic further configured to: determine, based on the message ID of the first ECU, that a transmit interval for the first ECU has opened and closed; determine that the first ECU did not attempt to transmit data during the transmit interval; determine that the first ECU is subject to a suspension attack; and generate an alert specifying that the first ECU is subject to the suspension attack.

Example 13 includes the subject matter of example 9, the logic further configured to: determine a voltage fingerprint of the first data frame; determine that the voltage fingerprint is not equal to a voltage feature of the first ECU; and modify, based on the determination that the voltage fingerprint is not equal to a voltage feature of the first ECU, at least a portion of the first data frame.

Example 14 includes the subject matter of example 13, wherein one or more of a cyclic redundancy check portion of the first data frame or a payload of the first data frame are to be modified to cause the other ECUs to reject the first data frame, wherein the network comprises a controller area network (CAN).

Example 15 includes the subject matter of example 9, further comprising a standby ECU of the plurality of ECUs configured to: analyze a first portion of a payload of the first data frame; determine that the first portion of the payload specifies to modify an operational parameter of the autonomous vehicle to a specified value; determine, based on a current state of the autonomous vehicle, that the specified value is outside a range of expected values for the operational parameter; and modify a second portion of the payload of the first data frame to cause the other ECUs to refrain from causing the operational parameter of the autonomous vehicle to have the specified value.

Example 16 includes the subject matter of example 15, the standby ECU further configured to: restrict the first ECU from operating in the autonomous vehicle; and operate as the first ECU in the autonomous vehicle.

Example 17 is a method, comprising: receiving, by logic implemented at least partially in hardware, an indication from a first electronic control unit (ECU) of a plurality of ECUs specifying to transmit a first data frame via a network of an autonomous vehicle; determine, by the logic based on a message identifier (ID) of the first ECU, whether a transmit window for the first ECU is open; and permit, by the logic, the first ECU to transmit the first data frame via the network based on a determination that the transmit window for the first ECU is open.

Example 18 includes the subject matter of example 17, further comprising: determining, by the logic, that a second ECU of the plurality of ECUs is to transmit a data frame via the network during the transmit window for the first ECU; delaying, by the logic, the transmission of the first data frame by the first ECU; and permitting, by the logic, the first ECU to transmit the first data frame subsequent to the second ECU transmitting the data frame and during the transmit window for the first ECU, at least a portion of the transmit window included in a transmit interval to transmit data via the network.

Example 19 includes the subject matter of example 18, further comprising: receiving, by the logic during the transmit interval, a second indication from the first ECU specifying to transmit a second data frame via the network during a second transmit window, at least a portion of the second transmit window included in the transmit interval; and permitting, by the logic, the first ECU to transmit the second data frame during the portion of the second transmit window included in the transmit interval based on the determination that the second ECU transmitted data via the network during the transmit window for the first ECU.

Example 20 includes the subject matter of example 17, further comprising: determining, by the logic based on the message ID of the first ECU, that a second transmit interval for the first ECU has elapsed; determining, by the logic, that the first ECU did not transmit data during the second transmit interval; determining, by the logic, that the first ECU is subject to a suspension attack; and generating, by the logic, an alert specifying that the first ECU is subject to the suspension attack.

Example 21 includes the subject matter of example 20, further comprising: determining, by the logic, a voltage fingerprint of the first data frame; determining, by the logic, that the voltage fingerprint is not equal to a voltage feature of the first ECU; and modifying, by the logic based on the determination that the voltage fingerprint is not equal to the voltage feature of the first ECU, at least a portion of the first data frame.

Example 22 includes the subject matter of example 21, the at least the portion of the first data frame comprising a cyclic redundancy check portion of the first data frame or a payload of the first data frame, wherein the network comprises a controller area network (CAN).

Example 23 includes the subject matter of example 17, further comprising: analyzing, by the logic, a first portion of a payload of the first data frame; determining, by the logic, that the first portion of the payload specifies to modify an operational parameter of the autonomous vehicle to a specified value; determining, by the logic based on a current state of the autonomous vehicle, that the specified value is outside a range of expected values for the operational parameter; and modifying, by the logic, a second portion of the payload of the first data frame to cause the other ECUs to refrain from causing the operational parameter of the autonomous vehicle to have the specified value.

Example 24 includes the subject matter of example 17, further comprising: restricting the first ECU from operating in the autonomous vehicle; and causing a standby ECU of the plurality of ECUs to operate as the first ECU in the autonomous vehicle.

Example 25 is an apparatus, comprising: means for a plurality of electronic control units of an autonomous vehicle communicably coupled by a network; means for receiving an indication from a first electronic control unit (ECU) of the plurality of ECUs specifying to transmit a first data frame via the network; means for determining, based on a message identifier (ID) of the first ECU, whether a transmit window for the first ECU is open; and means for permitting the first ECU to transmit the first data frame via the network based on a determination that the transmit window for the first ECU is open.

Example 26 includes the subject matter of example 25, further comprising: means for determining that a second ECU of the plurality of ECUs is to transmit a data frame via the network during the transmit window for the first ECU; means for delaying the transmission of the first data frame by the first ECU; and means for permitting the first ECU to transmit the first data frame subsequent to the second ECU transmitting the data frame and during the transmit window for the first ECU, at least a portion of the transmit window included in a transmit interval to transmit data via the network.

Example 27 includes the subject matter of example 26, further comprising: means for receiving, during the transmit interval, a second indication from the first ECU specifying to transmit a second data frame via the network during a second transmit window, at least a portion of the second transmit window included in the transmit interval; and means for permitting the first ECU to transmit the second data frame during the portion of the second transmit window included in the transmit interval based on the determination that the second ECU transmitted data via the network during the transmit window for the first ECU.

Example 28 includes the subject matter of example 25, further comprising: means for determining, based on the message ID of the first ECU, that a transmit interval for the first ECU has elapsed; means for determining that the first ECU did not attempt to transmit data during the transmit interval; means for determining that the first ECU is subject to a suspension attack; and means for generating an alert specifying that the first ECU is subject to the suspension attack.

Example 29 includes the subject matter of example 25, further comprising: means for determining a voltage fingerprint of the first data frame; means for determining that the voltage fingerprint is not equal to a voltage feature of the first ECU; and means for modifying, based on the determination that the voltage fingerprint is not equal to the voltage feature of the first ECU, at least a portion of the first data frame.

Example 30 includes the subject matter of example 29, wherein one or more of a cyclic redundancy check portion of the first data frame or a payload of the first data frame are to be modified to cause the other ECUs to reject the first data frame, wherein the network comprises a controller area network (CAN).

Example 31 includes the subject matter of example 25, further comprising: means for analyzing a first portion of a payload of the first data frame; means for determining that the first portion of the payload specifies to modify an operational parameter of the autonomous vehicle to a specified value; means for determining, based on a current state of the autonomous vehicle, that the specified value is outside a range of expected values for the operational parameter; and means for modifying a second portion of the payload of the first data frame to cause the other ECUs to refrain from causing the operational parameter of the autonomous vehicle to have the specified value.

Example 32 includes the subject matter of example 31, further comprising: means for restricting the first ECU from operating in the autonomous vehicle; and means for causing a standby ECU of the plurality of ECUs to operate as the first ECU in the autonomous vehicle.

Example 33 is a non-transitory computer-readable storage medium storing instructions which when executed by a processor circuit cause the processor circuit to: receive an indication from a first electronic control unit (ECU) specifying to transmit a first data frame via a network, the first ECU one of a plurality of ECUs communicably coupled by the network in an autonomous vehicle; determine, based on a message identifier (ID) of the first ECU, whether a transmit window for the first ECU is open; and permit the first ECU to transmit the first data frame via the network based on a determination that the transmit window for the first ECU is open.

Example 34 includes the subject matter of example 33, storing instructions which when executed by the processor circuit cause the processor circuit to: determine that a second ECU of the plurality of ECUs is to transmit a data frame via the network during the transmit window for the first ECU; delay the transmission of the first data frame by the first ECU; and permit the first ECU to transmit the first data frame subsequent to the second ECU transmitting the data frame and during the transmit window for the first ECU, at least a portion of the transmit window included in a transmit interval to transmit data via the network.

Example 35 includes the subject matter of example 34, storing instructions which when executed by the processor circuit cause the processor circuit to: receive, during the transmit interval, a second indication from the first ECU specifying to transmit a second data frame via the network during a second transmit window, at least a portion of the second transmit window included in the transmit interval; and permit the first ECU to transmit the second data frame during the portion of the second transmit window included in the transmit interval based on the determination that the second ECU transmitted data via the network during the transmit window for the first ECU.

Example 36 includes the subject matter of example 33, storing instructions which when executed by the processor circuit cause the processor circuit to: determine, based on the message ID of the first ECU, that a transmit interval for the first ECU has expired; determine that the first ECU did not transmit data during the transmit interval; determine that the first ECU is subject to a suspension attack; and generate an alert specifying that the first ECU is subject to the suspension attack.

Example 37 includes the subject matter of example 33, storing instructions which when executed by the processor circuit cause the processor circuit to: determine a voltage fingerprint of the first data frame; determine that the voltage fingerprint is not equal to a known voltage feature of the first ECU; and modify, based on the determination that the voltage fingerprint is not equal to the known voltage feature of the first ECU, at least a portion of the first data frame.

Example 38 includes the subject matter of example 37, wherein one or more of a cyclic redundancy check portion of the first data frame or a payload of the first data frame are to be modified to cause the other ECUs to reject the first data frame, wherein the network comprises a controller area network (CAN).

Example 39 includes the subject matter of example 33, storing instructions which when executed by the processor circuit cause the processor circuit to: analyze a first portion of a payload of the first data frame; determine that the first portion of the payload specifies to modify an operational parameter of the autonomous vehicle to a specified value; determine, based on a current state of the autonomous vehicle, that the specified value is outside a range of expected values for the operational parameter; and modify a second portion of the payload of the first data frame to cause the other ECUs to refrain from causing the operational parameter of the autonomous vehicle to have the specified value.

Example 40 includes the subject matter of example 39, storing instructions which when executed by the processor circuit cause the processor circuit to: restrict the first ECU from operating in the autonomous vehicle; and cause a standby ECU of the plurality of ECUs to operate as the first ECU in the autonomous vehicle.

In addition, in the foregoing, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An apparatus, comprising:
 a first interface to a microcontroller;
 a second interface to a controller area network (CAN);
 security circuitry communicatively coupled to the first and second interfaces, the security circuitry to:
  receive a first data frame from the microcontroller over the first interface;
  determine whether the microcontroller can transmit the first data frame to the CAN;
  transmit the first data frame to the CAN over the second interface when the microcontroller can transmit the first data frame to the CAN;
  receive a second data frame from the microcontroller over the first interface;
  determine whether the second data frame is part of a flooding attack;
  modify the second data frame to include errors to invalidate the second data frame when the second data frame is determined to be part of the flooding attack; and
  transmit the modified second data frame to the CAN over the second interface.

2. The apparatus of claim 1, the security circuitry to determine whether the second data frame is part of the flooding attack based on a duration for the second data frame.

3. The apparatus of claim 1, the security circuitry to compare a duration for the second data frame with a duration for a transmission window to determine whether the second data frame is part of the flooding attack.

4. The apparatus of claim 1, the security circuitry to determine whether the second data frame is part of the flooding attack based on when the second data frame is received.

5. The apparatus of claim 1, wherein the first data frame and the second data frame include a message identifier value that represents a higher priority level relative to other data frames in the CAN.

6. The apparatus of claim 1, the security circuitry to isolate the microcontroller from the CAN when the second data frame is determined to be part of the flooding attack.

7. The apparatus of claim 1, the security circuitry to modify the second data frame to include errors to invalidate the second data frame to cause other microcontrollers in the CAN to reject the second data frame when the second data frame is determined to be part of the flooding attack.

8. A system, comprising:
 an electronic control unit (ECU) for an autonomous vehicle;
 a controller area network (CAN) for the autonomous vehicle;
 a transceiver communicatively coupled to the ECU and the CAN, the transceiver to comprise a first interface to the ECU, a second interface to the CAN, and a security circuitry to:
  receive a first data frame from the ECU over the first interface;
  determine whether the ECU can transmit the first data frame to the CAN;
  transmit the first data frame to the CAN over the second interface when it is determined that the ECU can transmit the first data frame to the CAN;

receive a second data frame from the ECU over the first interface;

determine whether the second data frame is part of a flooding attack;

modify the second data frame to include errors to invalidate the second data frame when the second data frame is determined to be part of the flooding attack; and transmit the modified second data frame to the CAN over the second interface.

9. The system of claim 8, the security circuitry to determine whether the second data frame is part of the flooding attack based on a duration for the second data frame.

10. The system of claim 8, the security circuitry to compare a duration for the second data frame with a duration for a transmission window to determine whether the second data frame is part of the flooding attack.

11. The system of claim 8, the security circuitry to determine whether the second data frame is part of the flooding attack based on when the second data frame is received.

12. The system of claim 8, wherein the first data frame and the second data frame include a message identifier value that represents a higher priority level relative to other data frames in the CAN.

13. The system of claim 8, the security circuitry to isolate the ECU from the CAN when the second data frame is determined to be part of the flooding attack.

14. The system of claim 8, the security circuitry to modify the second data frame to include errors to invalidate the second data frame to cause other ECUs in the CAN to reject the second data frame when the second data frame is determined to be part of the flooding attack.

15. The system of claim 8, wherein the ECU, CAN and transceiver are part of an in-vehicle network (IVN) for the autonomous vehicle.

16. A transceiver, comprising:

a first interface to a controller;

a second interface to a controller area network (CAN) of an in-vehicle network (IVN) of a vehicle; and a security circuitry communicatively coupled to the first interface and the second interface, the security circuitry to:

receive a first data frame from the controller over the first interface;

determine whether the controller can transmit the first data frame to the CAN;

transmit the first data frame to the CAN over the second interface when the controller can transmit the first data frame to the CAN;

controller can transmit the first data frame to the CAN;

receive a second data frame from the controller over the first interface;

determine whether the second data frame is part of a flooding attack;

modify at least a portion of the second data frame to include one or more errors when the second data frame is determined to be part of the flooding attack; and transmit the modified portion of the second data frame to the CAN over the second interface.

17. The transceiver of claim 16, the security circuitry to determine whether the second data frame is part of the flooding attack based on a duration for the second data frame.

18. The transceiver of claim 16, the security circuitry to compare a duration for the second data frame with a duration for a transmission window to determine whether the second data frame is part of the flooding attack.

19. The transceiver of claim 16, wherein the first data frame and the second data frame include a message identifier value that represents a higher priority level relative to other data frames in the CAN.

20. The transceiver of claim 16, wherein the first interface, the second interface and the security circuitry are part of an integrated circuit chip.

* * * * *